US012719943B2

(12) United States Patent
Ryder et al.

(10) Patent No.: US 12,719,943 B2
(45) Date of Patent: Aug. 25, 2026

(54) DISCRETE COSINE HYPERPRIOR IN NEURAL IMAGE CODING

(71) Applicant: QUALCOMM Incorporated, San Diego, CA (US)

(72) Inventors: Thomas Alexander Ryder, San Diego, CA (US); Marta Karczewicz, San Diego, CA (US); Muhammed Zeyd Coban, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 18/410,556

(22) Filed: Jan. 11, 2024

(65) Prior Publication Data

US 2025/0233904 A1 Jul. 17, 2025

(51) Int. Cl.

*H04L 65/70* (2022.01)
*G06N 3/0455* (2023.01)
(Continued)

(52) U.S. Cl.

CPC ........... *H04L 65/70* (2022.05); *G06N 3/0455* (2023.01); *G06T 9/002* (2013.01); *G06T 9/007* (2013.01); *H04N 19/44* (2014.11); *G06T 2207/20052* (2013.01); *G06T 2207/20084* (2013.01); *H04N 19/61* (2014.11)

(58) Field of Classification Search

CPC ........ G06N 3/0455; G06T 2207/20052; G06T 2207/20084; G06T 9/002; G06T 9/007; H04L 65/70; H04N 19/44; H04N 19/61

See application file for complete search history.

(56) References Cited

U.S. PATENT DOCUMENTS

2002/0027954 A1* 3/2002 Singh .................... H04N 19/44 375/240.03
2012/0177108 A1* 7/2012 Joshi .................... H04N 19/625 375/240.18

(Continued)

FOREIGN PATENT DOCUMENTS

CN 116095333 A 5/2023
EP 1872588 B1 1/2021

(Continued)

OTHER PUBLICATIONS

Shi Y., et al., "AlphaVC: High-Performance and Efficient Learned Video Compression", Springer International Publishing, Jul. 29, 2022, pp. 616-631, XP047639358, section III, figure 2.

(Continued)

*Primary Examiner* — Peet Dhillon
(74) *Attorney, Agent, or Firm* — Shumaker & Sieffert, P. A.

(57) ABSTRACT

Example techniques and devices for coding media data are described. An example device for encoding media data includes one or more memories configured to store the media data and one or more processors implemented in circuitry and coupled to the one or more memories. The one or more processors are configured to determine a hyperprior variable of a neural video coder based on the media data. The one or more processors are configured to apply a discrete cosine transform (DCT) to the hyperprior variable to generate DCT coefficients and encode the DCT coefficients.

29 Claims, 19 Drawing Sheets

(51) Int. Cl.
*G06T 9/00* (2006.01)
*H04N 19/44* (2014.01)
*H04N 19/61* (2014.01)

(56) References Cited

U.S. PATENT DOCUMENTS

| | | | | |
|---|---|---|---|---|
| 2022/0272345 | A1* | 8/2022 | Besenbruch | H04N 19/13 |
| 2022/0321917 | A1 | 10/2022 | He et al. | |
| 2023/0096567 | A1 | 3/2023 | Nalci et al. | |
| 2023/0154055 | A1 | 5/2023 | Besenbruch et al. | |
| 2023/0419555 | A1* | 12/2023 | Minnen | G06N 3/088 |
| 2024/0020887 | A1* | 1/2024 | Ye | G06T 9/002 |
| 2025/0234043 | A1 | 7/2025 | Ryder et al. | |
| 2026/0006199 | A1* | 1/2026 | Duong | H04N 19/107 |

FOREIGN PATENT DOCUMENTS

| | | | |
|---|---|---|---|
| WO | 2023283184 | A1 | 1/2023 |
| WO | WO-2023159883 | A1 | 8/2023 |

OTHER PUBLICATIONS

Agustsson E., et al., "Scale-Space Flow for End-to-End Optimized Video Compression", 2020 IEEE/CVF Conference on Computer Vision and Pattern Recognition (CVPR), IEEE, Jun. 13, 2020 (Jun. 13, 2020), pp. 8500-8509, XP033805553, 10 Pages, Abstract Sections 1, 2, 3, 3.1 and 3.2.
Agustsson E., et al., "Universally Quantized Neural Compression", 34th Conference on Neural Information Processing Systems (NeurIPS 2020), Vancouver, Canada, arXiv:2006.09952v2 [stat.ML] Oct. 21, 2020, 21 Pages.
Anonymous: "End-to-end Learning of Video Compression Using Spatio-temporal Autoencoders", Under review as a conference paper at ICLR 2019, pp. 1-13.
Balle J., et al., "Density Modeling of Images Using a Generalized Normalization Transformation", Published as a Conference Paper at ICLR 2016, arXiv: 1511.06281v4 [cs.LG] Feb. 29, 2016, pp. 1-14.
Balle J., et al., "Variational Image Compression with A Scale Hyperprior", arXiv:1802.01436v2 [eess.IV], May 1, 2018, XP055632204, pp. 1-23, Section 2.
Bjontegaard G., "Calculation of Average PSNR Differences Between RD-curves", VCEG-M33, ITU—Telecommunications Standardization Sector, Study Group 16 Question 6, Video Coding Experts Group (VCEG), 13th Meeting, Austin, Texas, USA, Apr. 2-4, 2001, pp. 1-4.
Blau Y., et al., "The Perception-Distortion Tradeoff", arXiv:1711.06077v4 [cs.CV] Oct. 25, 2020, pp. 1-18.
Bossen F., et al., "VTM and HM Common Test Conditions and Software Reference Configurations for SDR 4:2:0 10-bit Video", JVET-Y2010-v1, Joint Video Experts Team (JVET) of ITU-T SG 16 WP 3 and ISO/IEC JTC 1/SC 29 25th Meeting, by Teleconference, Jan. 12-21, 2022, pp. 1-7.
Bossen F., "On Reporting Combined YUV BD Rates", JVET-N0341-v2, Joint Video Experts Team (JVET) of ITU-T SG 16 WP 3 and ISO/IEC JTC 1/SC 29/WG 11 14th Meeting, Geneva, CH, Mar. 19-27, 2019, pp. 1-6.
Bross B., et al., "Overview of the Versatile Video Coding (VVC) Standard and Its Applications", IEEE Transactions on Circuits and Systems for Video Technology, vol. 31, No. 10, Oct. 2021, pp. 3736-3764.
Chan K.C.K., et al., "BasicVSR: The Search for Essential Components in Video Super-Resolution and Beyond", arXiv:2012.02181v2 [cs.CV] Apr. 7, 2021, 14 Pages.
Chen H., et al., "NeRV: Neural Representations for Videos", arXiv:2110.13903v1 [cs.CV], 35th Conference on Neural Information Processing Systems, Sydney, Australia, Oct. 26, 2021, 15 Pages.
Cheng Z., et al., "Learned Image Compression with Discretized Gaussian Mixture Likelihoods and Attention Modules", CVPR, 2020, pp. 7939-7948.
Djelouah A., et al., "Neural Inter-Frame Compression for Video Coding", ICCV Paper, 2019, pp. 6421-6429.
Duong L.R., et al., "Multi-Rate Adaptive Transform Coding for Video Compression", arXiv:2210.14308v1 [eess.IV], Oct. 25, 2022, 5 Pages.
Egilmez, H.E., et al., "Transform Network Architectures for Deep Learning Based End-to-End Image/Video Coding in Subsampled Color Spaces", IEEE Open Journal of Signal Processing, IEEE, vol. 2, Jun. 24, 2021 (Jun. 24, 2021), XP011880429, pp. 441-452, DOI: 10.1109/OJSP.2021.3092257 [retrieved on Sep. 27, 2021] the whole document.
Francois E., et al., "Adjusting Luma/Chroma BD-Rate Balance in ECM", JVET-AC0138-v5, Joint Video Experts Team (JVET) of ITU-T SG 16 WP 3 and ISO/IEC JTC 1/SC 29 29th Meeting, by Teleconference, Jan. 11-20, 2023, pp. 1-9.
Granziol D., et al., "Iterate Averaging in the Quest for Best Test Error", arXiv:2003.01247v5 [stat.ML] Oct. 31, 2021, Journal of Machine Learning Research 1, Jul. 2021, pp. 1-46.
Granziol D., et al., "Learning Rates as a Function of Batch Size: A Random Matrix Theory Approach to Neural Network Training", Journal of Machine Learning Research 23, Published on Jun. 2022, pp. 1-65.
Grill J-B., et al., "Bootstrap Your Own Latent a New Approach to Self-Supervised Learning", 34th Conference on Neural Information Processing Systems, Vancouver, Canada, 2020, pp. 1-14.
Guo Z., et al., "Causal Contextual Prediction for Learned Image Compression", arXiv:2011.09704v5 [cs.CV] Oct. 31, 2021, IEEE Transactions on Circuits and Systems on Video Technology, pp. 1-13.
Guo Z., et al., "Soft then Hard: Rethinking the Quantization in Neural Image Compression", arXiv:2104.05168v4 [eess.IV] Mar. 25, 2024, 16 Pages.
Habibian A., et al., "Video Compression with Rate-Distortion Autoencoders", arXiv: 1908.05717v2 [eess.IV], Nov. 13, 2019, Cornell University Library, 201 Olin Library Cornell University, Ithaca, NY, 14853, Aug. 14, 2019, 14 Pages, 20191113, XP081531236, abstract, Sections 1-4, figures 1-3.
He D., et al., "Checkerboard Context Model for Efficient Learned Image Compression", arXiv:2103.15306v2 [eess.IV] Apr. 1, 2021, 16 Pages.
He D., et al., "ELIC: Efficient Learned Image Compression with Unevenly Grouped Space-Channel Contextual Adaptive Coding", arXiv:2203.10886v2 [cs.CV] Mar. 29, 2022, pp. 1-20.
He K., et al., "Masked Autoencoders Are Scalable Vision Learners", arXiv:2111.06377v3 [cs.CV], Proceedings of the IEEE/CVF Conference on Computer Vision and Pattern Recognition, Dec. 19, 2019, pp. 1-14.
Ho Y-H., et al., "Learned Video Compression for YUV 4:2:0 Content Using Flow-based Conditional Inter-frame Coding", arXiv:2210.08225v1 [eess.IV] Oct. 15, 2022, 5 Pages.
Hu Z., et al., "Coarse-to-Fine Deep Video Coding with Hyperprior-Guided Mode Prediction", arXiv: 2206.07460v1 [cs.CV], Jun. 15, 2022, 13 Pages.
Hu Z., et al., "FVC: A New Framework towards Deep Video Compression in Feature Space", arXiv:2105.09600v2 [eess.IV] Aug. 23, 2021, pp. 1502-1511.
Hu Z., et al., "Improving Deep Video Compression by Resolution-adaptive Flow Coding", arXiv:2009.05982v1 [cs.CV] Sep. 13, 2020, pp. 1-20.
Ioffe S., et al., "Batch Normalization: Accelerating Deep Network Training by Reducing Internal Covariate Shift", arXiv: 1502.03167v3 [cs.LG], International Conference on Machine Learning, Mar. 2, 2015, pp. 1-11, XP055266268, Section 3.1, Algorithm 2, 3.2.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

(56) References Cited

OTHER PUBLICATIONS

Izmailov P., et al., “Averaging Weights Leads to Wider Optima and Better Generalization”, arXiv:1803.05407v3 [cs.LG] Feb. 25, 2019, 12 Pages.
Kodak: “Kodak Lossless True Color Image Suite”, True Color Kodak Images, Accesses since Nov. 15, 1999, pp. 1-2.
Koyuncu A.B., et al., “Contextformer: A Transformer with Spatio-Channel Attention for Context Modeling in Learned Image Compression”, arXiv:2203.02452v2 [eess.IV] Jul. 20, 2022, pp. 1-31.
Ladune T., et al., “Aivc: Artificial Intelligence Based Video Codec”, arXiv:2202.04365v3 [cs.NE] Jun. 28, 2022, 5 Pages.
Ladune T., et al., “Conditional Coding for Flexible Learned Video Compression”, arXiv:2104.07930v3 [eess.IV] Apr. 28, 2021, Published as a Workshop Paper at ICLR 2021 Neural Compression Workshop, pp. 1-18.
Lee J., et al., “Context-adaptive Entropy Model for End-Toend Optimized Image Compression”, arXiv:1809.10452v4 [eess.IV] May 6, 2019, Published as a conference paper at ICLR 2019, pp. 1-20.
Lee J.C., et al., “FFNeRV: Flow-Guided Frame-Wise Neural Representations for Videos”, arXiv:2212.12294v2 [cs.CV] Aug. 7, 2023, 15 Pages.
Li J., et al., “Deep Contextual Video Compression”, arXiv:2109.15047v2 [eess.IV], Dec. 14, 2021, 35th Conference on Neural Information Processing Systems, Sydney, Australia, 2021, 19 Pages.
Li J., et al., “Hybrid Spatial-Temporal Entropy Modelling for Neural Video Compression”, arXiv:2207.05894v1 [eess.IV], Jul. 13, 2022, 17 Pages.
Li J., et al., “Neural Video Compression with Diverse Contexts”, arXiv:2302.14402v3 [eess.IV], Mar. 14, 2023, 19 Pages.
Li Y., et al., “Towards Explaining the Regularization Effect of Initial Large Learning Rate in Training Neural Networks”, arXiv:1907.04595v2 [cs.LG] Apr. 25, 2020, Apr. 28, 2020, pp. 1-49.
Li Z., et al., “E-NeRV: Expedite Neural Video Representation with Disentangled Spatial-Temporal Context”, arXiv:2207.08132v1 [cs.CV] Jul. 17, 2022, pp. 1-27.
Lin J., et al., “M-LVC: Multiple Frames Prediction for Learned Video Compression”, arXiv:2004.10290v1 [eess.IV] Apr. 21, 2020, 14 Pages.
Lu G., et al., “DVC: An End-To-End Deep Video Compression Framework”, arXiv:1812.00101v3 [eess.IV], Apr. 7, 2019, IEEE/CVF Conference on Computer Vision and Pattern Recognition (CVPR), IEEE, Jun. 15, 2019, XP033686979, 14 Pages, Abstract, Section 2.3, subsection “Introduction of Notations” in Section 3, Sections 3.2-3.4, Figures 2-4, the whole document.
Mentzer F., et al., “High-Fidelity Generative Image Compression”, 34th Conference on Neural Information Processing Systems (NeurIPS), Vancouver, Canada, arXiv:2006.09965v3 [eess.IV] Oct. 23, 2020, 20 Pages.
Mentzer F., et al., “VCT: A Video Compression Transformer”, arXiv:2206.07307v2 [cs.CV] Oct. 12, 2022, 36th Conference on Neural Information Processing Systems (NeurIPS 2022), pp. 1-19.
Mercat A., et al., “UVG Dataset: 50/120fps 4K Sequences for Video Codec Analysis and Development”, Ultra Video Group, Tampere University, Finland, 2020, 6 Pages.
Minnen D., et al., “Channel-Wise Autoregressive Entropy Models for Learned Image Compression”, arXiv:2007.08739v1 [eess.IV], Cornell University Library, 201 Olin Library Cornell University Ithaca, NY 14853, Jul. 17, 2020, XP081722259, the whole document, 16 Pages.
Minnen D., et al., “Joint Autoregressive and Hierarchical Priors for Learned Image Compression”, arXiv: 1809.02736v1 [cs.CV], Cornell University Library, 201 Olin Library Cornell University Ithaca, NY 14853, Sep. 8, 2018 (Sep. 8, 2018), XP081188741, 22 pages, abstract, figure 1, figures 17, 18, 19, 21, sections 1 and 2, section 4, paragraphs [0001], [0002] abstract.
Nesterov Y., “Introductory Lectures on Convex Optimization”, Kluwer Academic Publishers, A Basic Course, vol. 87, 2004, 253 Pages.
Papyan V., “The Full Spectrum of Deepnet Hessians at Scale: Dynamics with SGD Training and Sample Size”, arXiv:1811.07062v2 [cs.LG] Jun. 3, 2019, 16 Pages.
Pourreza R., et al., “Boosting Neural Video Codecs by Exploiting Hierarchical Redundancy”, arXiv:2208.04303v2 [eess.IV], Sep. 16, 2022, Qualcomm Technologies, pp. 1-11.
Pourreza R., et al., “Extending Neural P-frame Codecs for B-frame Coding”, arxiv.org, Cornell University Library, 201 Olin Library Cornell University Ithaca, NY 14853, 2021 IEEE/CVF International Conference on Computer Vision, IEEE, Oct. 10, 2021, XP034092812, 18 Pages, XP091023768, Abstract, figures 3,4 paragraphs [0003], [0004], Sections 1 and 3, figures 1-6.
Ranjan A., et al., “Optical Flow Estimation using a Spatial Pyramid Network”, arXiv:1611.00850v2 [cs.CV] Nov. 21, 2016, pp. 1-10.
Rippel O., et al., “ELF-VC: Efficient Learned Flexible-Rate Video Coding”, arXiv:2104.14335v1 [eess.IV] Apr. 29, 2021, 10 Pages.
Santurkar S., et al., “How Does Batch Normalization Help Optimization?”, arXiv:1805.11604v5 [stat.ML] Apr. 15, 2019, 32nd Conference on Neural Information Processing Systems (NeurIPS 2018), Montreal, Canada, 2019, 26 Pages.
Sheng X., et al., “Temporal Context Mining for Learned Video Compression”, IEEE Transactions on Multimedia, arXiv:2111.13850v2 [cs.CV] Jan. 30, 2023, pp. 1-13.
Strom J., et al., “Working Practices Using Objective Metrics for Evaluation of Video Coding Efficiency Experiments (Draft 4)”, JVET-T2016-v2, Joint Video Experts Team (JVET) of ITU-T SG 16 WP 3 and ISO/IEC JTC 1/SC 29 20th Meeting, by Teleconference, Oct. 7-16, 2020, pp. 1-12.
Sullivan G.J., et al., “Overview of the High Efficiency Video Coding (HEVC) Standard”, IEEE Transactions on Circuits and Systems for Video Technology, IEEE Service Center, Piscataway, NJ, US, vol. 22, No. 12, Dec. 1, 2012, XP011487803, pp. 1649-1668, 20120101, 20 Pages.
Sullivan G.J., et al., “Rate-Distortion Optimization for Video Compress”, PictureTel Corporation, Jul. 15, 1998, pp. 1-38.
Vahdat A., et al., “NVAE: A Deep Hierarchical Variational Autoencoder”, arXiv:2007.03898v3 [stat.ML] Jan. 8, 2021, 34th Conference on Neural Information Processing Systems (NeurIPS 2020), Vancouver, Canada, 2021, 21 Pages.
Wallace G K: “The JPEG Still Picture Compression Standard” IEEE Transactions on Consumer Electronics, IEEE Service Center, NY, US vol. 38, No. 1, Feb. 1, 1992, pp. 1-17, XP000297354.
Wang H., et al., “MCL-JCV: A JND-Based H.264/AVC Video Quality Assessment Dataset”, 2016 IEEE International Conference on Image Processing (ICIP), 2016, pp. 1509-1513.
Wang Z., et al., “Multi-Scale Structural Similarity for Image Quality Assessment”, IEEE, Proceedings of the 37th IEEE Asilomar Conference on Signals, Systems and Computers, Pacific Grove, CA, Nov. 9-12, 2003, pp. 5.
Wien M., et al., “High Efficiency Video Coding, Coding Tools and Specification”, Chapter 1, Springer, 2015, 39 Pages.
Wu C-Y., et al., “Video Compression Through Image Interpolation”, arXiv:1804.06919v1 [cs.CV] Apr. 18, 2018, pp. 1-18.
Xue T., et al., “Video Enhancement with Task-Oriented Flow”, International Journal of Computer Vision, arXiv:1711.09078v3 [cs.CV], Nov. 10, 2019, pp. 1-20.
Yang R., et al., “Learning for Video Compression with Hierarchical Quality and Recurrent Enhancement”, arXiv:2003.01966v7 [eess.IV] Aug. 3, 2020, pp. 1-14.
Yang X-S., et al., “Proceedings of Sixth International Congress on Information and Communication Technology”, Lecture Notes in Networks and Systems 235, London, vol. 1, ICICT 2021, 982 Pages.
Zhang R., et al., “The Unreasonable Effectiveness of Deep Features as a Perceptual Metric”, arXiv:1801.03924v2 [cs.CV] Apr. 10, 2018, pp. 1-14.
Zhu Y., et al., “Transformer-Based Transform Coding”, Sep. 29, 2021, XP093005391, the whole document, pp. 1-35.
U.S. Appl. No. 18/410,581, filed Jan. 11, 2024, naming inventors Ryder et al.
Non-Final Office Action from copending U.S. Appl. No. 18/410,581 dated Oct. 31, 2025, 12 pp.

(56) References Cited

OTHER PUBLICATIONS

Balle J., et al., “Variational Image Compression with a Scale Hyperprior”, arXiv:1802.01436v2 [eess.IV], May 1, 2018, XP055632204, pp. 1-23, Cited in the Application Abstract, Figure 4 p. 11.
Fu H., et al., “WeConvene: Learned Image Compression with Wavelet-Domain Convolution and Entropy Model”, arXiv:2407.09983v1 [stat.AP], Arxiv.org, Cornell University Library, 201 Olin Library Cornell University Ithaca, NY 14853, Jul. 13, 2024, pp. 1-16, XP091820751, Abstract, figures 2, 3 Sections 3.1, 3.2.
International Search Report and Written Opinion—PCT/US2024/052407—ISA/EPO—Jan. 30, 2025.

* cited by examiner

ONE OR MORE PROCESSORS 1412

ONE OR MORE MEMORIES 1410

TRAINING INPUT 1402

CORRUPT I-FRAME 1404

P-FRAMES 1406

THRESHOLD 1440

MEDIA ENCODER 200

P-FRAME MODEL 1420

MEDIA DECODER 300

P-FRAME MODEL 1430

DISCRETE COSINE HYPERPRIOR IN NEURAL IMAGE CODING

TECHNICAL FIELD

This disclosure relates to media encoding and decoding, including the encoding and decoding of images and video data.

BACKGROUND

Digital media capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

SUMMARY

In general, this disclosure describes techniques for media compression, including techniques for video and/or image encoding and decoding. Media (e.g., images and/or video) compression methods based on neural networks can outperform current standards and provide several additional advantages. Video coders (which may be media coders) based on neural networks may be referred to as neural video coders (NVCs).

This disclosure addresses techniques to improve coding using neural media coders, such as NVCs. Some example NVCs utilize a non-parametric approach to univariate density estimation, amortizing learning across channels rather than using a hyperprior variable. However, an output variable may retain much information of a hyperprior variable. As such, it may be desirable to utilize the hyperprior variable in modeling the output variable.

This disclosure also describes improved training techniques. Training of NVCs may result in an accumulation of temporal errors over larger test-time Group of Pictures (GOP) sizes. As such, some NVCs attempt to correct for this accumulation of temporal errors by implementing a weighted objective where distortion importance increases as a function of depth in a training sequence. While such a technique may delay deterioration, the technique still struggles to preserve quality over long sequences of pictures. Therefore, it may be desirable to train an NVC such that the NVC may accumulate improved reconstructions across subsequent training frames.

While the coding ability of NVCs has improved, work remains to be completed for NVCs to compete with conventional or hand-designed approaches, such as codecs implementing VVC. It should be noted that this disclosure may use the term codec and coder interchangeably. This disclosure discusses several techniques for use in both neural image and video compression (e.g., media compression). These techniques are often simple, model-agnostic and may easily be incorporated into other techniques. This disclosure also identifies that current evaluation protocols significantly disadvantage conventional, hand-designed coders, and provide a basis to encourage future comparison using test conditions of video standards organizations. A coder based on the techniques of this disclosure, built on the conditional coding framework, may outperform published approaches-many by a large margin. A neural coder utilizing such techniques can outperform VVC in the metric for which it was intended: a weighted YUV-PSNR.

In one example, a method of encoding media data includes: determining a hyperprior variable of a neural video coder based on the media data; applying a discrete cosine transform (DCT) to the hyperprior variable to generate DCT coefficients; and encoding the DCT coefficients.

In another example, a method of decoding media data includes determining DCT coefficients of a hyperprior variable of a neural video coder; applying an inverse DCT to the DCT coefficients to generate the hyperprior variable; and decoding the media data based on the hyperprior variable.

In another example, a device for encoding media data includes one or more memories configured to store the media data; and one or more processors implemented in circuitry and coupled to the one or more memories, the one or more processors being configured to: determine a hyperprior variable of a neural video coder based on the media data; apply a discrete cosine transform (DCT) to the hyperprior variable to generate DCT coefficients; and encode the DCT coefficients.

In another example, a device for decoding media data includes one or more memories configured to store the media data; and one or more processors implemented in circuitry and coupled to the one or more memories, the one or more processors being configured to: determine DCT coefficients of a hyperprior variable of a neural video coder; apply an inverse DCT to the DCT coefficients to generate the hyperprior variable; and decode the media data based on the hyperprior variable.

The details of one or more examples are set forth in the accompanying drawings and the description below. Other features, objects, and advantages will be apparent from the description, drawings, and claims.

DETAILED DESCRIPTION

This disclosure describes techniques for encoding and decoding media data (e.g., images or videos), such as video data, using neural-network-based media coding techniques. In particular, this disclosure describes techniques for utilizing a hyperprior variable in modeling the output variable, for example, through the application of a discrete cosine transform (DCT) to the hyperprior variable. This disclosure also describes techniques for training a neural media coder, such as an NVC, and the use of such a trained neural media coder, to avoid or reduce the accumulation of temporal errors, for example, through the use of a corrupt I-frame. A corrupt I-frame may be an I-frame that has a peak signal-to-noise ratio (PSNR) that meets a threshold and/or an I-frame that has one or more areas of inserted errors. Such techniques, either separately, or together, may improve the quality of video coding, such as the PSNR, thereby providing for a better viewing experience by viewers of decoded video data.

Figure 1:
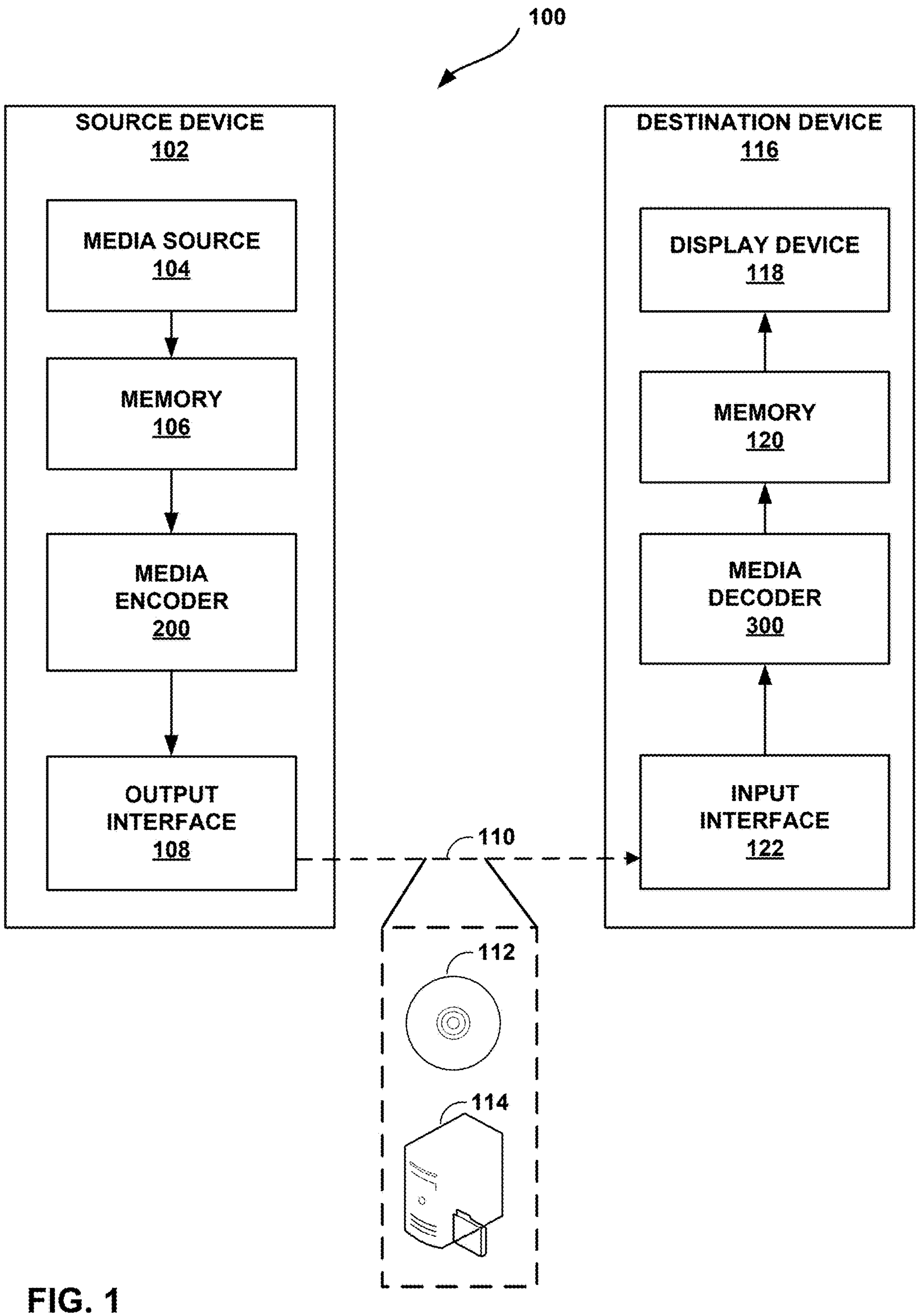
FIG. 1 is a block diagram illustrating an example media encoding and decoding system that may perform the techniques of this disclosure.

FIG. 1 is a block diagram illustrating an example media encoding and decoding system 100 that may perform the techniques of this disclosure. In the context of this disclosure, media may include any digital file to be compressed, including video data and/or images. The example techniques of this disclosure are generally directed to coding (encoding and/or decoding) video data and/or image data. While examples of FIG. 1 will be described with reference to media encoding and decoding, the techniques of this application are equally applicable to the encoding and decoding of any type of data file using neural-based compression techniques.

As shown in FIG. 1, system 100 includes a source device 102 that provides encoded media data to be decoded and displayed by a destination device 116, in this example. In particular, source device 102 provides the media data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes media source 104, memory 106, media encoder 200, and output interface 108. Destination device 116 includes input interface 122, media decoder 300, memory 120, and display device 118. In accordance with this disclosure, media encoder 200 of source device 102 and media decoder 300 of destination device 116 may be configured to apply the techniques for media coding in a neural-based media compression system. Thus, source device 102 represents an example of a media encoding device, while destination device 116 represents an example of a media decoding device. In other examples, a source device and a destination device may include other components or arrangements. For example, source device 102 may receive media data from an external media source, such as an external camera. Likewise, destination device 116 may interface with an external display device, rather than include an integrated display device.

System 100, as shown in FIG. 1, is merely one example. In general, any digital media encoding and/or decoding device may perform techniques for media coding in a neural-based media compression system. Source device 102 and destination device 116 are merely examples of such coding devices in which source device 102 generates coded media data for transmission to destination device 116. This disclosure refers to a "coding" device as a device that performs coding (encoding and/or decoding) of data. Thus, media encoder 200 and media decoder 300 represent examples of coding devices, in particular, a media encoder and a media decoder, respectively. In some examples, media encoder 200 and media decoder 300 may be examples of NVCs. In some examples, source device 102 and destination device 116 may operate in a substantially symmetrical manner such that each of source device 102 and destination device 116 includes media encoding and decoding components. Hence, system 100 may support one-way or two-way media transmission between source device 102 and destination device 116, e.g., for video streaming, video playback, video broadcasting, or video telephony.

In general, media source 104 represents a source of media data (i.e., raw, unencoded media data) and provides a sequential series of pictures (also referred to as "frames") of the media data to media encoder 200, which encodes data for the pictures. Media source 104 of source device 102 may include a video capture device, such as a video camera, a video archive containing previously captured raw video, and/or a video feed interface to receive video from a video content provider. As a further alternative, media source 104 may generate computer graphics-based data as the source media, or a combination of live media, archived media, and computer-generated media. In each case, media encoder 200 encodes the captured, pre-captured, or computer-generated media data. Media encoder 200 may rearrange the pictures from the received order (sometimes referred to as "display order") into a coding order for coding. Media encoder 200 may generate a bitstream including encoded media data. Source device 102 may then output the encoded media data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw media data, e.g., raw media from media source 104 and raw, decoded media data from media decoder 300. Additionally, or alternatively, memories 106, 120 may store software instructions executable by, e.g., media encoder 200 and media decoder 300, respectively. Although memory 106 and memory 120 are shown separately from media encoder 200 and media decoder 300 in this example, it should be understood that media encoder 200 and media decoder 300 may also include internal memories for functionally similar or equivalent purposes. Furthermore, memories 106, 120 may store encoded media data, e.g., output from media encoder 200 and input to media decoder 300. In some examples, portions of memories 106, 120 may be allocated as one or more buffers, e.g., to store raw, decoded, and/or encoded media data.

Computer-readable medium 110 may represent any type of medium or device capable of transporting the encoded media data from source device 102 to destination device 116. In one example, computer-readable medium 110 represents a communication medium to enable source device 102 to transmit encoded media data directly to destination device 116 in real-time, e.g., via a radio frequency network or computer-based network. Output interface 108 may modulate a transmission signal including the encoded media data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded media data.

In some examples, source device 102 may output encoded media data to file server 114 or another intermediate storage device that may store the encoded media data generated by source device 102. Destination device 116 may access stored media data from file server 114 via streaming or download.

File server 114 may be any type of server device capable of storing encoded media data and transmitting that encoded media data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (cMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded media data from file server 114 through any standard data connection, including an Internet connection. This may include a wireless channel (e.g., a Wi-Fi connection), a wired connection (e.g., digital subscriber line (DSL), cable modem, etc.), or a combination of both, that is suitable for accessing encoded media data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded media data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded media data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to media encoder 200 and/or output interface 108, and destination device 116 may include an SoC device to perform the functionality attributed to media decoder 300 and/or input interface 122.

The techniques of this disclosure may be applied to media coding in support of any of a variety of multimedia applications, such as over-the-air television broadcasts, cable television transmissions, satellite television transmissions, Internet streaming media transmissions, such as dynamic adaptive streaming over HTTP (DASH), digital media that is encoded onto a data storage medium, decoding of digital media stored on a data storage medium, or other applications.

Input interface 122 of destination device 116 receives an encoded media bitstream from computer-readable medium 110 (e.g., a communication medium, storage device 112, file server 114, or the like). The encoded media bitstream may include signaling information defined by media encoder 200, which is also used by media decoder 300. Display device 118 displays decoded pictures of the decoded media data to a user. Display device 118 may represent any of a variety of display devices such as a liquid crystal display (LCD), a plasma display, an organic light emitting diode (OLED) display, or another type of display device.

Although not shown in FIG. 1, in some examples, media encoder 200 and media decoder 300 may each be integrated with an audio encoder and/or audio decoder, and may include appropriate MUX-DEMUX units, or other hardware and/or software, to handle multiplexed streams including both audio and media in a common data stream.

Media encoder 200 and media decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of media encoder 200 and media decoder 300 may be included in one or more encoders or decoders, either of which may be integrated as part of a combined encoder/decoder (CODER) in a respective device. A device including media encoder 200 and/or media decoder 300 may comprise an integrated circuit, a microprocessor, and/or a wireless communication device, such as a cellular telephone.

Image and video (e.g., media) compression methods based on neural networks can be competitive to current standards and provide several additional advantages.

This disclosure describes addresses techniques to improve coding using neural media coders, such as NVCs. Most NVCs utilize a non-parametric approach to univariate density estimation, amortizing learning across channels rather than a hyperprior variable. However, an output variable may retain much information of a hyperprior variable. As such, it may be desirable to utilize the hyperprior variable in modeling the output variable, such as by applying a DCT to a hyperprior variable.

This disclosure also describes improved training techniques for an NVC. Training of NVCs may result in an accumulation of temporal errors over larger test-time Group of Pictures (GOP) sizes. As such, some NVCs attempt to correct for this accumulation by implementing a weighted objective where distortion importance increases as a function of depth in a training sequence. While such a technique may delay deterioration, the technique still struggles to preserve quality over long sequences. Therefore, it may be desirable to train an NVC such that the NVC may accumulate improved reconstructions across subsequent training frames. The techniques of this disclosure include training a P-frame model using a corrupt I-frame which may reduce or improve the accumulation of temporal errors by an NVC.

Figure 2:
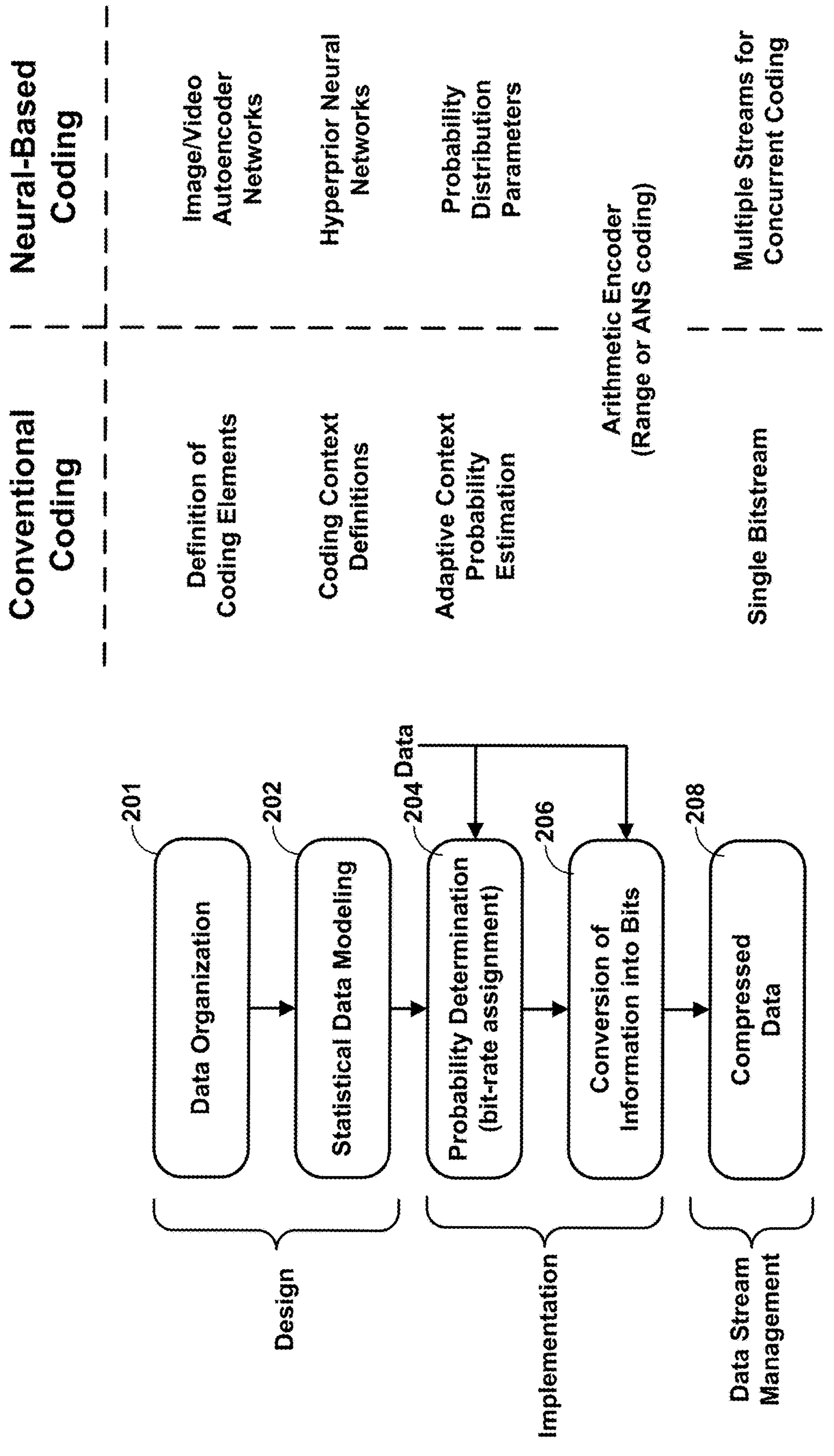
FIG. 2 is a conceptual diagram illustrating example differences between conventional media coding and neural-based media coding.

FIG. 2 is a conceptual diagram illustrating example differences between conventional media coding and neural-based media coding. Because conventional (e.g., hand-designed) and neural-based coders use very distinct forms of compression, conventional and neural-based coders employ entropy coding in significantly different ways. A summary of the main differences is shown in FIG. 2, where it can be observed that, even if the two approaches use the same coding method, like arithmetic coding, all the other aspects are different. This means that it is beneficial to develop new techniques to optimize the performance in neural-based coders.

As shown in FIG. 2, the design phase of both conventional and neural-based coding techniques include data organization process 201 and statistical data modeling process 202. For conventional media coding techniques, such as H.265, data organization process 201 includes the definition of coding elements (e.g., syntax elements and coding modes). For neural-based coding processes, data organization process 201 includes the training and development of image/video (e.g., media) autoencoder networks. For statistical data modeling process 202, conventional coding techniques include the coding of context definitions, e.g., for an entropy coding process, such as context-adaptive binary arithmetic coding. For neural-based coding processes, statistical data modeling process 202 includes the development and training of a hyperprior neural network.

Both conventional and neural-based coding techniques include an implementation phase that includes probability determination process 204 and conversion of information into bits process 206. Both the probability determination process 204 and conversion of information into bits process 206 are based on the data to be coded. For conventional coding, probability determination process 204 (e.g., a bit-rate assignment process) includes adaptive context probability estimation. For neural-based coding, probability determination process 204 includes the determination of probability distribution parameters, as will be described in more detail below. Both the conventional and neural-based coding techniques use an arithmetic and/or entropy coder (e.g., or arithmetic or entropy encoder or decoder) for the conversion of information into bits process 206. The arithmetic coder may be a Huffman, range or asymmetric numeral system (ANS) coding.

The data stream management phase is the management of compressed data 208. In some example conventional coding systems, the compressed data is in a single bitstream. Some example neural-based coding systems use multiple streams for concurrent coding.

One important class of methods proposed for neural-based image and video compression adapts the variational autoencoder architecture, where the latent variables are quantized and entropy coded using fixed learned distributions. In some examples, this architecture has been extended by adding a smaller neural network, called "hyperprior," that uses the latent variables generated from the autoencoder to define the probability distributions to be used for entropy coding those autoencoder latent variables. This hyperprior network also uses quantization and entropy coding, but with pre-defined (e.g., learned) PDF parameters.

FIG. 3A is a block diagram of an example neural image coder using variational autoencoder and hyperprior networks for entropy coding according to one or more aspects of this disclosure. The process shown in FIG. 3A, where the neural networks for image analysis and synthesis implement the variational autoencoder, and entropy coding of its variables is defined by the hyperprior decoder network (used at both sender and receiver). Since "encoder" and "decoder" (e.g., media encoder 200 and media decoder 300) have been used to denote autoencoder parts, in the neural network literature it is common to refer to the systems traditionally called by those names as "sender" and "receiver," respectively. Input image 400 and output image 428 may include a picture or a frame of video data.

In FIG. 3A, media encoder 200 may include image analysis neural network 402, hyperprior encoder neural network 404, DCT process 405, quantization process 406, entropy encoding process 408, quantization process 416, and entropy encoding process 418. Media encoder 200 may also include entropy decoding process 412, hyperprior decoder neural network 424, inverse DCT (IDCT) process 423, entropy decoding process 422, and image synthesis neural network 426. Collectively, these components or functions may be similar to a reconstruction loop or decoding loop in a hybrid video coder. Though not shown, media decoder 300 may include similar structures to entropy decoding process 412, hyperprior decoder neural network 424, IDCT process 423, entropy decoding process 422, and image synthesis neural network 426 to reconstruct output images. For example, media encoder 200 may output bit stream 1 410 and bit stream 2 420. Media decoder 300 may obtain bit stream 1 410 and bit stream 2 420 and, similarly to media encoder 200, generate output images, like output image 428, through the use of structures similar to entropy decoding process 412, hyperprior decoder neural network 424, IDCT process 423, entropy decoding process 422, and image synthesis neural network 426.

Image analysis neural network 402 is a neural network configured to encode and/or compress input image 400. The compressed data stream created by image analysis neural network 402 is then processed by hyperprior encoder neural network 404. The output of hyperprior encoder neural network 404, which may include hyperprior variables, then undergoes DCT process 405. DCT process 405 may include applying a DCT to the output of hyperprior encoder neural network 404 to generate DCT coefficients of hyperprior variables. The output of DCT process 405 (e.g., the DCT coefficients) is quantized by quantization process 406 and entropy coded by entropy encoding process 408 to create bitstream 1 410. Hyperprior encoder neural network 404 is part of the process configured to determine parameters (e.g., a standard deviation, a variance, a mean, etc.) of a PDF for the data stream created by image analysis neural network 402. The parameters of the PDF may then be used to entropy encode the data stream from image analysis neural network 402.

Entropy encoding process 408 itself uses learned parameters 414 that are learned from a plurality of images to be encoded. Learned parameters 414 may include learned motion parameters. For a P-frame model, such learned parameters 414 may be learned using a corrupted I-frame, as discussed further later in this disclosure. Entropy decoding process 412 uses the same PDF parameters to entropy decode bitstream 1 410. The entropy decoded bitstream may correspond to quantized DCT coefficients. This entropy decoded bitstream is input to IDCT process 423 where an inverse DCT is applied to the entropy decoded bitstream. The output of IDCT process 423 is processed by hyperprior decoder neural network 424 in order to generate the PDF parameters for the specific image (e.g., input image 400) being decoded. PDF parameters may include variance information, such as standard deviation, mean, etc. associated with a hyperprior.

The PDF parameters generated by hyperprior decoder neural network 424 are then used by entropy encoding process 418 to encode the data stream produced by image analysis neural network 402 after quantization by quantization process 416. Entropy encoding process 418 create bitstream 2 420. Bitstream 2 420 is then entropy decoded by entropy decoding process 422 using the same PDF parameters from hyperprior decoder neural network 424. After entropy decoding, image synthesis neural network 426 processes the decoded data to produce output image 428.

By applying DCT process 405 to the output of hyperprior encoder neural network 404 (e.g., hyperprior variables), media encoder 200 may compress hyperprior information further than in an existing NVC. Media encoder 200 and media decoder 300 may use corresponding IDCT process 423 to produce a quantized version of the output of hyperprior encoder neural network 404.

Figure 7A:
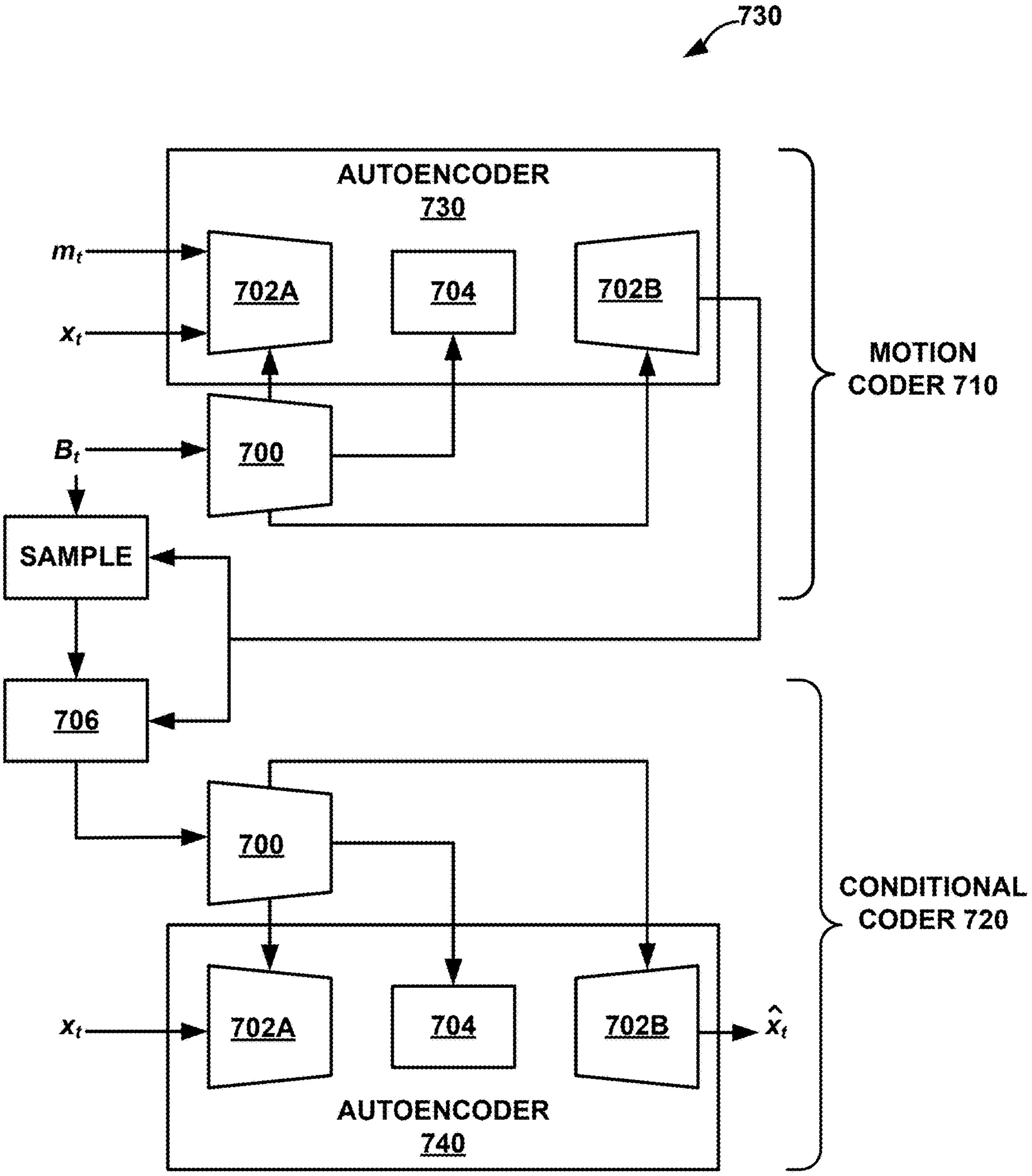
FIG. 7A is a block diagram illustrating an example of a conditional P-frame model.
Figure 7B:
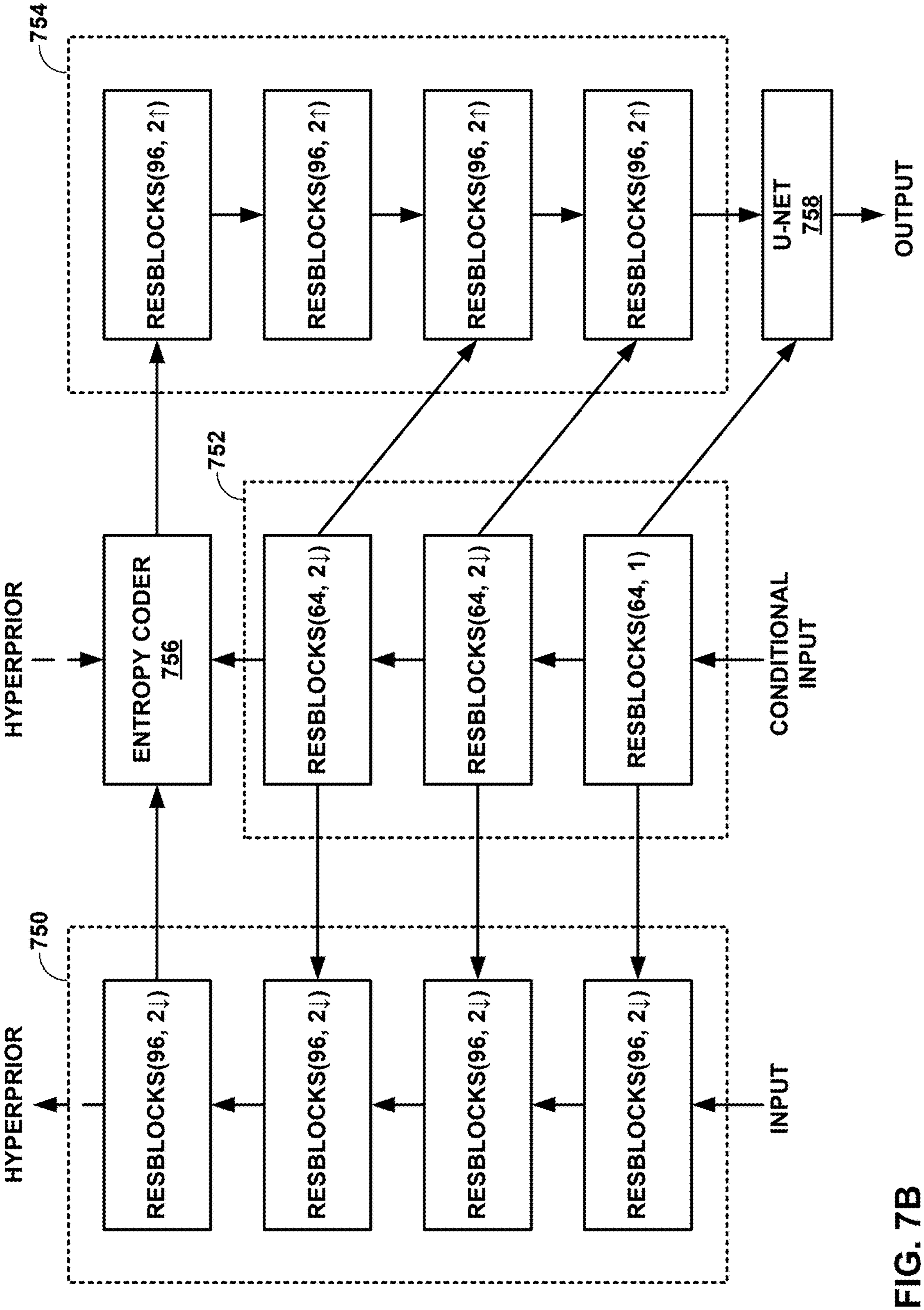
FIG. 7B is a block diagram of an example architecture of a conditional analysis and synthesis transforms according to one or more aspects of this disclosure.

Image analysis neural network 402, hyperprior encoder neural network 404, hyperprior decoder neural network 424, and or image synthesis neural network 426, or portions thereof, may be implemented similarly to the example architecture set forth in FIGS. 7A and 7B.

In some examples, an NVC, such as media encoder 200, may encode media data (e.g., input image 400). Media encoder 200 may determine a hyperprior variable of an NVC (e.g., media coder 200) based on the media data. For example, the hyperprior variable may be an output of hyperprior encoder neural network 404. Media encoder 200 may apply a DCT (e.g., DCT 405) to the hyperprior variable to generate DCT coefficients. Media encoder 200 may encode the DCT coefficients, for example, by applying quantization 406 and entropy encoding 408.

In some examples, an NVC, such as media decoder 300, may decode media data (e.g., from encoded media data of bit stream 1 410). Media decoder 300 may determine DCT coefficients of a hyperprior variable of an NVC (e.g., media encoder 200). For example, media decoder 300 may apply entropy decoding 412 to bit stream 1 410 to determine the DCT coefficients. Media decoder 300 may apply inverse DCT 423 to the DCT coefficients to generate the hyperprior variable. Media decoder 300 may decode the media data based on the hyperprior variable. For example, media decoder 300 may process the hyperprior variable with hyperprior decoder neural network 424 entropy decoding 422, and image synthesis neural network 426 (or similar structures) to generate output image 428.

determine a hyperprior variable of an NVC (e.g., media coder 200) based on the media data. For example, the hyperprior variable may be an output of hyperprior encoder neural network 404. Media encoder 200 may apply a DCT (e.g., DCT 405) to the hyperprior variable to generate DCT coefficients. Media encoder 200 may encode the DCT coefficients, for example, by applying quantization 406 and entropy encoding 408.

Conventional video coders, such as those set forth in the VVC and HEVC standards (Bross et al., 2021; Sullivan et al., 2012), predicated on the predictive coding framework, have long been popular for lossy video compression. Developed in standards communities over the past 30 years, such coders have an improved ability to efficiently store and transmit data compared with prior coders and may have supported much economic growth. However, despite the success of such conventional approaches, which may be restricted to hand-crafted linear sub-modules, improvement has slowed, with gains yielding diminishing returns.

In the search for improved performance, there has been interest in the emerging field of neural video coders (NVCs) (Lu et al., 2019; Agustsson et al., 2020; Hu et al., 2021; Li et al., 2021; Rippel et al., 2021; Li et al., 2022a; Mentzer et al., 2022). Media encoder 200 and media decoder 300 (FIG. 1) may be examples of NVCs. With NVCs, techniques may replace (or entirely re-engineer) hand-crafted sub-modules with differentiable neural operations, training the coder end-to-end. However, despite the afforded flexibility, NVCs have thus far struggled to produce competitive coding results at practical decode speeds. Nonetheless, progress has been relatively rapid, with many of the open questions endemic to these NVC approaches remaining unanswered.

This disclosure describes techniques related to the use of decoded information. Unlike the predictive coding paradigm of conventional approaches, those working in the field of NVCs have yet to reach consensus on a unified approach to the use of decoded information. Example approaches can be broadly classified into a number of frameworks that define the use of past information: predictive coding (in which a coder codes the residual difference between a motion-compensated frame and a target frame) (Lu et al., 2019;

Agustsson et al., 2020; Hu et al., 2021); conditional coding (where the coder conditions a target frame on motion-compensated information) (Li et al., 2022a; 2021; Ladune et al., 2021; Ladune & Philippe, 2022); and techniques where the coder does not use explicit motion compensation (such as 3D autoencoders) (Habibian et al., 2019; Pessoa et al., 2020).

This disclosure also describes techniques relating to how to minimize or reduce temporal error accumulation. Unlike conventional approaches, it is uncommon for NVCs to perform test-time coding with rate-distortion optimization (RDO) (Sullivan & Wiegand, 1998). Via a search procedure, a conventional coder can allocate bits across a group-of-pictures (GOP) to preserve frame quality and minimize bitrate. In lieu of this allocation, most NVCs will experience a quality deterioration across large GOP sizes on which the coder—for reasons of time and memory—cannot be trained. Despite some ad hoc solutions to this problem (Chan et al., 2021; Sheng et al., 2022), the standard approach remains insertion of high-bit still images (e.g., I-frames) at a greater frequency than the low-delay modes of conventional coders. This may present a significant disadvantage when compared to conventional coders. For example, Sheng et al. (2022) notes that in HEVC, moving from a GOP of 12 (common to NVCs) to 32 improves the Bjontegaard-delta (BD) rate (Bjontegaard, 2001) by an average of 23.8%.

According to the techniques of this disclosure, a conditional coding framework may operate in an LDP (low-delay P frame) configuration (e.g., using prediction from single a reference). This technique is supported by the information theoretic result that the residual's (Shannon) entropy is greater than or equal to that of the conditional entropy (Ladune et al., 2021):

$$H(x_t \mid \tilde{x}_t) \leq H(x_t - \tilde{x}_t),$$

where $x_t$ and $\tilde{x}_t$ are the current and motion-compensated frame, respectively. Unlike conventional coding techniques, neural networks are free to explore complex non-local pixel dependence and learn arbitrarily complex conditional relationships through non-linear estimators. As such, an NVC may use conditional coding (Li et al., 2022a).

According to the techniques of this disclosure, media encoder 200 or media decoder 300 may apply the conditional coding paradigm to motion estimation. Media encoder 200 or media decoder 300 may also apply buffering ideas from conventional coders to model long-range dependence in motion estimation, mitigating visual challenges such as occlusion.

According to the techniques of this disclosure, media encoder 200 or media decoder 300 may mitigate or circumvent the temporal error propagation otherwise endemic to low-delay NVCs. For example, such media encoder 200 or media decoder 300 may, like conventional coders, be capable of achieving superior results (when compared to other NVCs) on an "infinite" intra-period across standard validation tasks, such as one I-frame followed by all P-frames.

This disclosure discusses variants to probability models for an autoencoder that may otherwise be ubiquitous to image and video coders.

This disclosure discusses an analysis of common evaluation protocols discussed in literature and provides a basis to encourage future comparison against conventional approaches with a weighted YUV-PSNR metric.

According to the techniques of this disclosure, a resulting NVC coder (e.g., media encoder 200 or media decoder 300) may achieve improved results when compared to other NVC coders. Such an NVC coder may be capable of beating the VVC test model (VTM) across VTM common test conditions (CTC) (Bossen et al., 2022) in YUV-PSNR.

Related work is now discussed. Some example existing works in neural image compression have been based on the mean-scale hyperprior (Ball'e et al., 2018). Loosely viewed as a variational autoencoder (VAE), this family of approaches most commonly posits a two-level hierarchy of latent variables such that the rate-distortion objective is given by $$\mathcal{L} = R(\hat{y} \mid h_s(\hat{z})) + R(\hat{z}) + \lambda D(x, \hat{x}),$$

where $\hat{y}=g_a(x)$ and $\hat{z}=h_a(y)$ are the quantized first- and second-level latent variables, respectively, and $\hat{x}=g_s(\hat{y})$ is the reconstruction. Here $g_a$, $h_a$, $g_s$ and $h_s$ are so-called analyzer, hyper-analyzer, synthesizer and hyper-synthesizer functions, respectively. A balance between the rate estimation $R(\hat{y}|\hat{z})+R(\hat{z})$ and the distortion function $D(x,\hat{x})$ is achieved via Lagrange multiplier $\lambda$.

Extending on this formulation, approaches have considered improving rate estimation with autoregressive models (Minnen et al., 2018; He et al., 2021; 2022a; Minnen & Singh, 2020; Koyuncu et al., 2022; Lee et al., 2018), more sophisticated transforms (Cheng et al., 2020; Zhu et al., 2021), along with improved gradient estimators for the non-differentiable quantization operator (Agustsson & Theis, 2020; Guo et al., 2021b). These advances have achieved much progress with many techniques outperforming VVC in RGB-PSNR and MS-SSIM (Wang et al., 2003).

Following the success in image compression, many have applied these techniques to video. Here most research has focused on a low-delay (LD) configuration: using time-previous reference frames to code the current frame, e.g., a P-frame. An LD codec may be a codec that codes video data in a time sequential frame order (F0, F1, F2, . . . ) as opposed to a random access coder. It should be noted that there is a distinction between LDP (low-delay P-frame) and LDB (low-delay B-frame): B may, for a given pixel in the current frame, use any number of previous frames; P may use only one.) In an alternative to LD, random-access (RA) configurations are free to code using both past and future frames.

The causal inference structure of RA, most suitable for applications without latency constraints (e.g., streaming services), typically reduces BD rate by ~30%. While a number of coders have leveraged frame interpolation and bi-directional motion estimation to extend NVCs to RA (Pourreza & Cohen, 2021; Wu et al., 2018; Djelouah et al., 2019; Yang et al., 2020), these techniques remain less well-studied than LD NVCs.

In LD, most work has adopted predictive coding ideas of conventional approaches (Rippel et al., 2021; Agustsson et al., 2020; Hu et al., 2021; 2020; Lin et al., 2020). In such cases, compressed motion information may be used to derive a motion-compensated frame. Approaches to motion estimation include augmenting optical flow predictions with Gaussian blur (Agustsson et al., 2020), learning offset maps for use in deformable convolutions (Hu et al., 2021), etc. Given a motion-compensated frame, a coder using these techniques will code the sparse difference between the motion-compensated and target frames. Recently, a number of proposals have extended the predictive coding framework to conditional coding (Li et al., 2022a; 2021; Ladune et al., 2021; Ladune & Philippe, 2022). Broadly differing in their use of motion, coders may directly code the target frame conditioned on motion-compensated decoded information, as opposed to coding the residual. In practice, this conditioning resolves to concatenating conditional information into both analysis and synthesis transforms. As discussed, this result may leverage many advantages of the neural formulation.

Apart from the inductive bias of explicit motion estimation, a number of researchers have considered 3D autoencoders (Habibian et al., 2019; Pessoa et al., 2020). As a natural extension of image compression, such techniques extend the input dimension to consider convolutions over both space and time. Recently, Mentzer et al. (2022) proposed augmenting image coders to include a transformer-based entropy model conditioned on previously decoded latent variables. Assuming independence between frame reconstructions, this approach may avoid the problem of quality deterioration while being competitive (e.g., computationally competitive) with predictive coding techniques.

Finally, neural representation techniques, not applicable to low-latency applications, have emerged as potential alternatives, with relatively fast decode speeds (Lee et al., 2022; Chen et al., 2021; Li et al., 2022b). Despite such relatively fast decode speeds, results are not presently competitive with the "state-of-the-art" conventional coders, and amortizing the cost of sending network weights across a sequence is only valid if the entire sequence is viewed, which is not guaranteed.

Figure 4:
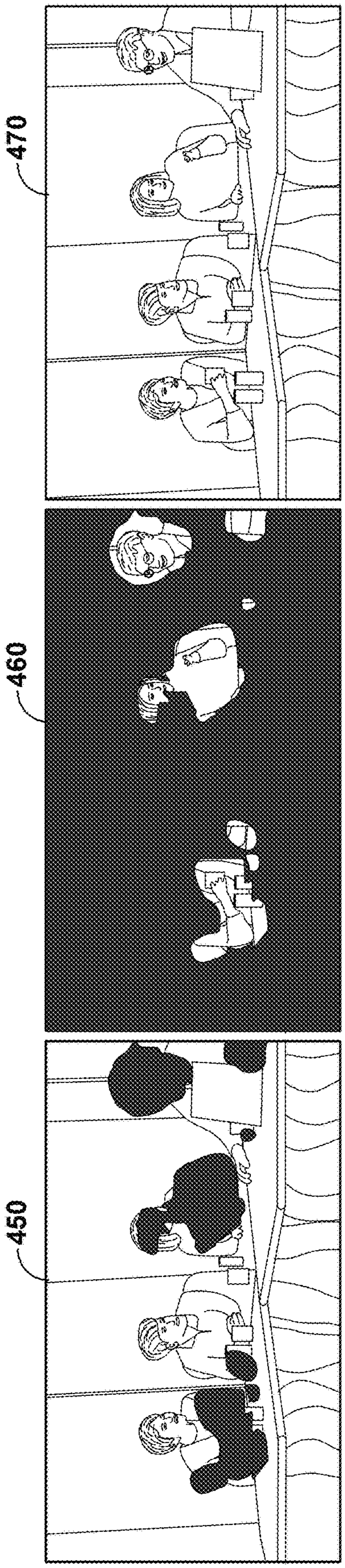
FIG. 4 is a conceptual diagram illustrating an example of adaptive reference selection.

FIG. 4 is a conceptual diagram illustrating an example of adaptive reference selection. In the example of FIG. 4, one or more hard masks are used to select regions from previous reconstructions (see panels 450 and 460) to use as a basis for prediction, such as for predicting frame 470. Hard masks in panels 450 and 460 are represented as black areas which black out portions of the panel. Such hard masks may be used to isolate hard samples representing a particular type, such as a face.

A compression backbone for media encoder 200 and/or media decoder 300 is now described. According to the techniques of this disclosure, an NVC, such as media encoder 200 and/or media decoder 300, may use three autoencoder models: one for the I-Frame and two for the P-frame. The P-frame models may include (conditional) motion estimation and conditional coder modules. The compression backbone of each model may be based on the mean-scale hyperprior. However, as performance of such an approach may not be on par with other conventional coders, media encoder 200 and/or media decoder 300 may apply extensions to this model in order to achieve competitive performance.

Context modeling is now described. Extending beyond the fully factorized constraints of early entropy modeling remains important to produce competitive results. Unlike in the earliest attempts (Minnen et al., 2018), extending as such should not greatly compromise time complexity. To circumvent a sacrifice of time complexity, some have considered group-based autoregressions, such as checkerboard and channel-wise models (He et al., 2021; Minnen & Singh, 2020). One uneven channel-wise grouping strategy is presented in He et al. (2022a).

According to the techniques of this disclosure, media encoder 200 or media decoder 300 may employ an uneven spatially sub-sampled checkerboard. For example, media encoder 200 and/or media decoder 300 may divide the latent variable into three groups: the first two group each decode 25% of the data; and the last group decodes the remaining 50%. Media encoder 200 and/or media decoder 300 may build the checkerboard by stacking shifted copies of 4×4 masks. In such a way, the autoregression alternates access to spatial locations between channels, yielding a full spatial context at each autoregressive step. A diagram of such a causal structure is depicted in FIG. 5.

Figure 5:
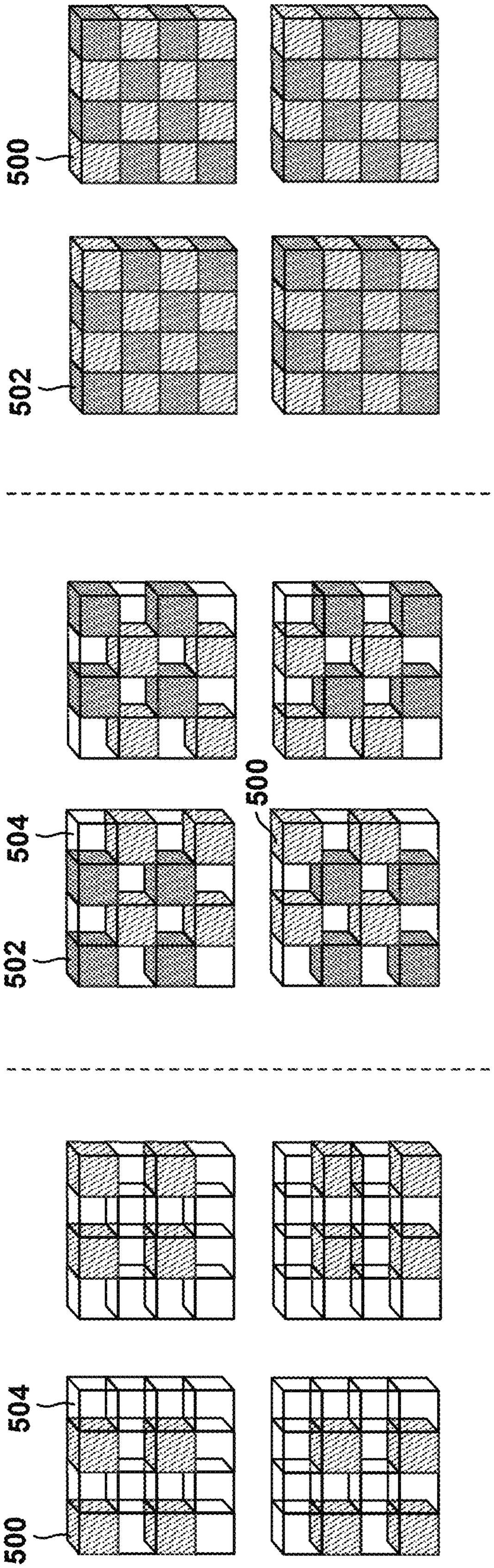
FIG. 5 is a conceptual diagram illustrating an example causal inference structure of an uneven checkerboard context module.

FIG. 5 is a conceptual diagram illustrating an example causal inference structure of an uneven checkerboard context module. The causal inference structure proceeds from left to right in the example of FIG. 5. In FIG. 5, there are three representations of pixels. The pixels shaded as those labeled 500, represent pixels to be inferred. The pixels that are shaded as those labeled 502 represent decoded pixels. The pixels that are transparent like those labeled 504 represent unavailable pixels.

Applying a DCT to a hyperprior is now discussed. While it is common to use powerful density estimation techniques for $\hat{y}$, the hyperprior $p(\hat{z})$ is generally not afforded that same flexibility. Following from Ballé et al. (2018), most NVCs leverage their non-parametric approach to univariate density estimation. As they "have no prior beliefs about the hyperprior," this approach seeks to amortize learning of $p(\hat{z})$ across channels, which eschews the expression of spatial and/or frequency information.

Figure 6:
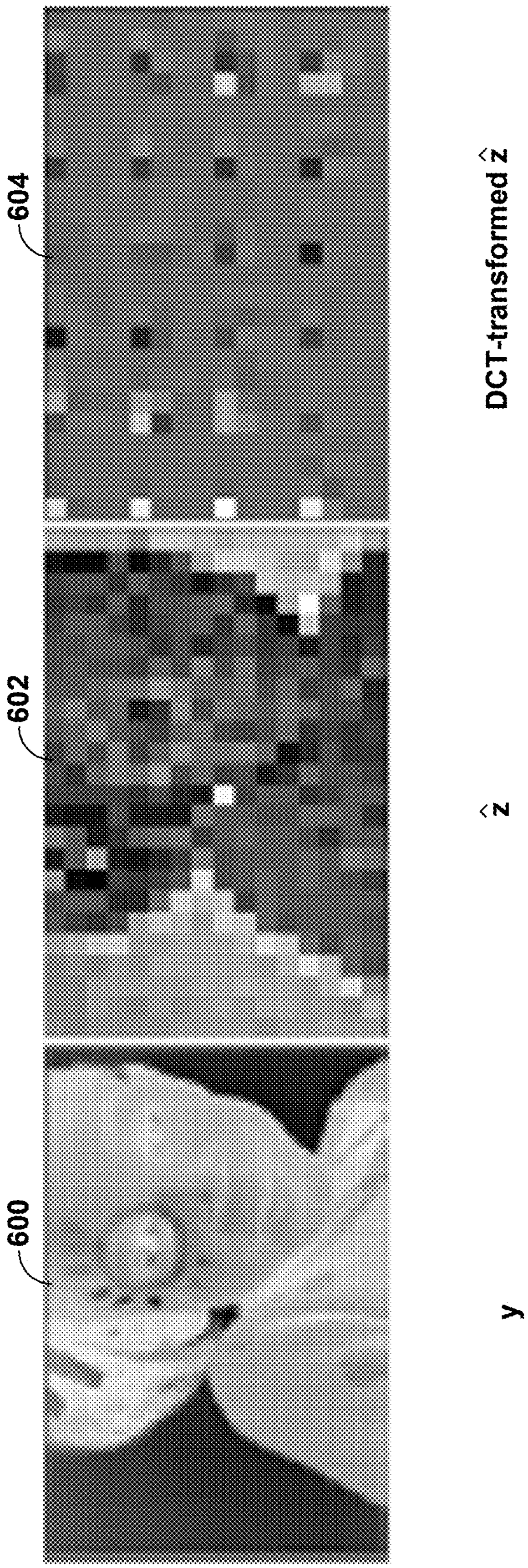
FIG. 6 is a conceptual diagram illustrating example channels of y, $\hat{z}$, and DCT-transformed $\hat{z}$.

FIG. 6 is a conceptual diagram illustrating example channels of y, $\hat{z}$, and DCT-transformed $\hat{z}$. y 600 may be an example of an output of image analysis neural network 402 of FIG. 3A. z, not shown in FIG. 6, may be a hyperprior variable, for example, output by hyperprior encoder neural network 404. $\hat{z}$ 602 may be an example of an output of quantization process 406 if the hyperprior variable z (e.g., the output of hyperprior encoder neural network 404) were not subjected to DCT process 405, but instead fed directly into quantization process 406 (all of FIG. 3A). DCT-transformed $\hat{z}$ 604 may be an example of output of DCT process 405 of FIG. 3A (e.g., a DCT-transformed hyperprior variable).

Visual inspection of FIG. 6 reveals that $\hat{z}$ 602 retains much of the structure of input y 600. In such a case, there is a strong basis to form a prior belief: the statistics of $\hat{z}$ 602 are not dissimilar from a natural image. To exploit this similarity, media encoder 200 and/or media decoder 300 may model the hyperprior using the discrete cosine transform. For example, media encoder 200 and/or media decoder 300 may use a channel-wise 4×4 block-based parametric mixture model of DCT coefficients (e.g., DCT-transformed $\hat{z}$ 604) which media encoder 200 or media decoder may quantize and entropy code. As compared to earlier approaches, media encoder 200 and/or media decoder 300 permit the description of frequency information, disentangling the latent representation. This technique may improve performance for minimal inference complexity as discussed further below.

In some examples, media encoder 200 and media decoder 300 may be symmetric encoders and decoders and may include a number of residual blocks, such as five or six residual blocks, omitting popular ideas such as non-local attention blocks. Media encoder 200 and/or media decoder 300 may follow Li et al. (2022a) and utilize a multi-granularity quantization. While their work focused on a learned quantization bin-size in multi-rate models, their work improved rate-distortion performance in single-rate models. As such, along with predicting a mean and variance, $\mu_i$ and $$\sigma_i^2,$$

media encoder 200 and/or media decoder 300 may predict an $a_i$ which may be used to provide content-adaptive scaling of variables prior- and post-quantization. For example, media encoder 200 and media decoder 300 may be built from a symmetric architecture of 5 residual blocks of 192 channels. For example, hyper-networks may be built out of 2 residual blocks, both of 256 channels. A kernel size of three may be used everywhere and upsampling may be accomplished with transposed convolutions.

For example, a first-level latent variable y may be downsampled a total of 3 times, as compared to the typical 4, for example by quantization 416. For example, this choice, in combination with the content-adaptive quantization bin-size, may present a good balance between exploiting spatial redundancy and retaining high-frequency information.

The application of such a compression backbone discussed above to P-frame coding is now discussed. As mentioned above, this disclosure discusses the use of decoded information and efforts to limit quality deterioration. The P-frame of media encoder 200 and/or media decoder 300 may proceed, at a high-level, as follows. A pre-trained optical flow model (Ranjan & Black, 2017) may estimate a motion vector $$m_t = f(x_t, \hat{x}'_{t-1})$$

between a current and reference frame. The motion vector may be compressed and reconstructed, $\hat{m}_t$, with use of a coder buffer Bt. An extension of conditional coding to motion vector compression and the use of the coder buffer are discussed further below. Using $\hat{m}_t$, media encoder 200 and/or media decoder 300 may warp a reference feature $F_{t-1}$ and use that warped reference feature as conditional input to a conditional autoencoder. This may return the reconstruction and feature of the target frame, $\hat{x}_t$ and $F_t$.

FIG. 7A is a block diagram illustrating an example of a conditional P-frame model. In the example of FIG. 7A, the boxes labeled 700 represent conditional encoders, the boxes labeled 702A and 702B represent synthesis and analysis transforms, and the boxes labeled 704 represent probability estimation and entropy coding.

Conditional P-frame model 730, which may be an example of some or all of image analysis neural network 402, may include a motion coder 710 and conditional coder 720. Motion coder 710 may include autoencoder 730 and may code motion associated with an input video sequence. For example, motion coder 710 may encode motion based on a motion signal m, and the input video sequence xx. Input video sequence x, may include input image 400 of FIG. 3. Autoencoder 740 may generate a quantized version of the input video sequence $\hat{x}_t$.

Box 706 may apply a Gubel-Softmax function to sample(s) from coder buffer Bt. For example, in Low-Delay coding, reference frames are selected from previously decoded frames coder buffer $B_t$ for prediction. In Low-Delay P. generally only one reference block/pixel/frame may be selected for prediction. In order to allow an NVC to select one reference block from many, the NVC produces sampling probabilities for each pixel. For example, if the NVC is coding a frame at time t=4, the reference buffer (e.g., coder buffer) has decoded frames t=1, 2, 3. The NVC may output a probability of selection for each pixel in each of those potential reference frames from the reference buffer. For example, for any one pixel in any one color channel, P may equal [0.2, 0.3, 0.5], e.g., a 50% probability NVC should include t=3, a 30% probability NVC should include t=2, etc. However, because the NVC is a low-delay NVC, the NVC may select only one of the three. So the NVC may turn the P vector in a one-hot probability, (e.g., where one bit is high (1) and all others are low (0)). To accomplish this, the NVC may apply the Gumbel-Softmax function. As such, the NVC determines the maximum of the probability vector in such a way that can be differentiated. In the example of P=[0.2, 0.3, 0.5], the output of box 706 (the application of the Gubel-Softmax function, would be gumbel_softmax(p)=[0, 0, 1]. In such a case, the NVC may choose reference frame t=3 for that particular position in the final reference frame.

The same architecture may be used for both conditional autoencoders of the P-frame model and the I-frame model (e.g., of media encoder 200 and media decoder 300). This technique is discussed further later in this disclosure. A conditional encoder (e.g., conditional coder 720)—may include small residual blocks—and may produce a spatial pyramid of features for concatenation to both analysis and synthesis transforms. Three features (or "contexts") may be extracted: $C_1$, $C_2$, $C_3$. The highest resolution feature $C_1$ may combined with the output of a conditional synthesis transform via a U-Net to produce the final output. In some examples, an autoencoder, such as motion coder 710, according to the techniques of this disclosure may not include a U-Net. Such a conditional architecture may include a simplification of Li et al. (2022a), which disclose a W-net, and allow downsampled motion vectors to warp each feature scale independently. In the approach of Li et al. (2022a), warped features are updated using a top-down "feature fusion" network, updating $\tilde{C}_2$ from $\tilde{C}_3$, and $\tilde{C}_1$ from $\tilde{C}_2$, $\tilde{C}_3$, where $\tilde{C}_i$ is the warped feature at scale i. In some examples, media encoder 200 and/or media decoder 300 may not utilize or avoid this updating of warped features using a top-down feature fusion network.

Figure 3:
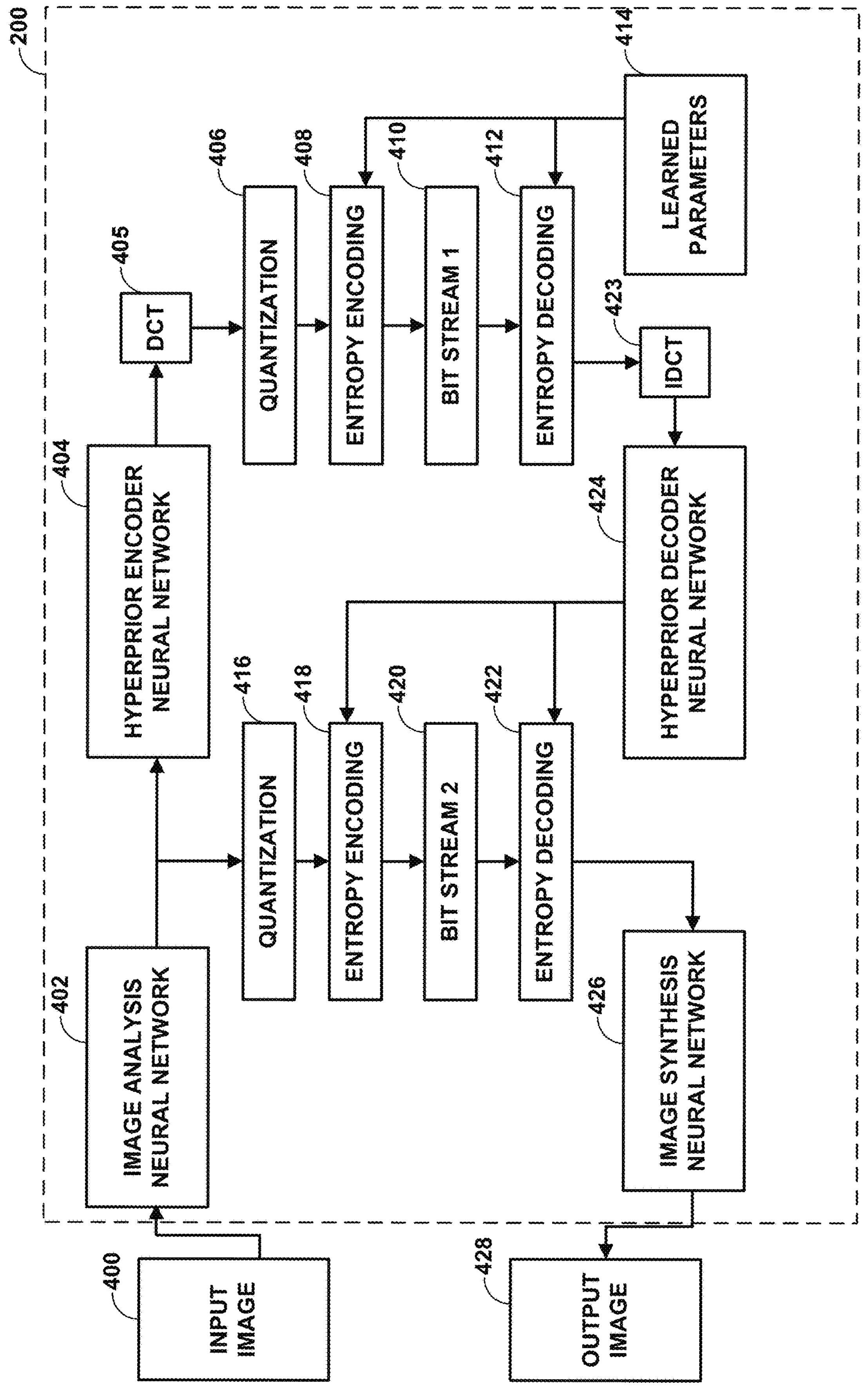
FIG. 3 is a block diagram of an example neural image coder using variational autoencoder and hyperprior networks for entropy coding according to one or more aspects of this disclosure.

FIG. 7B is a block diagram of an example architecture of a conditional analysis and synthesis transforms according to one or more aspects of this disclosure. For example, conditional analysis transform 750 (which may be an example of conditional analysis transform 702A of FIG. 7A) may obtain an input, such as input video sequence $x_t$., and generate an output (e.g., a latent variable), for example, which may be input to hyperprior encoder neural network 404 (FIG. 3). Conditional analysis transform 750 may also send the output to entropy coder 756 for entropy coding in which case entropy coder 756 may be an example of entropy encoding 418 (FIG. 3). Conditional encoder 752, which may be an example of probability estimation and entropy coding 704 of FIG. 7A, may obtain conditional input(s) (e.g., motion vectors) and output conditional coded data to entropy coder 756. Conditional analysis transform 754 may obtain an output of entropy coder 756 and output to, for example, U-Net 758. U-Net 758 may generate an output, such as a quantized version of the input video sequence $\tilde{x}_t$.

Conditional motion estimation is now discussed. While temporal redundancy may exist across frames, there are many types of motion for which temporal redundancy additionally exists across motion vectors. This observation has been successfully exploited in prior work-approaches have resolved to predict motion vectors before coding sparse updates (Rippel et al., 2021; Pourreza et al., 2023). These techniques may enhance motion prediction without sending additional bits.

Extending on the theoretical superiority of conditional coding, this idea may be applied to motion estimation. It may be noted that Ladune & Philippe (2022) apply techniques conditioned on reference frames only, not reference motion vectors. Here, media encoder 200 and/or media decoder 300 may use previously transmitted reference frames to derive motion vectors as conditional inputs for use by a motion autoencoder. That is, given a buffer of reference frames $\{\hat{x}_{t-3}, \hat{x}_{t-2}, \hat{x}_{t-1}\}$, media encoder 200 and/or media decoder 300 may use an optical flow to re-estimate vectors $\{\tilde{m}_{t-2}=f(\hat{x}_{t-2}, \hat{x}_{t-3}), \tilde{m}_{t-1}=f(\hat{x}_{t-1}, \hat{x}_{t-2})\}$. The difference between the reconstructed motion vector $\hat{m}_i$ and those re-calculated for use in conditioning $\tilde{m}_i$ may be noted. It may also be noted that use of previous reconstructions (e.g., the output of a conditional autoencoder) may make evaluation over large GOP sizes unstable. In addition, as it may be impractical to train on sequence lengths that regularly fill a multi-frame buffer during normal operation, media encoder 200 and/or media decoder 300 may use an I-frame model to initialize a pseudo-buffer of decoded P-frames. This approach allows media encoder 200 and/or media decoder 300 to be trained on relatively short sequences.

Adaptive reference selection is now discussed. Conventional coders may select reference blocks from a buffer of decoded frames for motion prediction (e.g., Wien (2015)). Such coders may select the best block from the buffer—and its resultant motion prediction—that minimizes the error between the motion-compensated and current frame. This technique allows coders to model long-range dependencies, overcoming visual challenges such as occlusion.

A such, an NVC (e.g., media encoder 200 or media decoder 300) may use such a buffer to model long-range dependencies. Such a technique may be referred to as adaptive reference selection (ARS). That is, given a buffer of reference frames and their associated motion vectors, media encoder 200 and/or media decoder 300 may, along with the reconstructed motion vector, return a pixel-wise tensor of sampling probabilities along with a warping skip mode. Using the Gumbel-Softmax operator, media encoder 200 and/or media decoder 300 may use this tensor of probabilities to sample from a reference buffer, before warping the result using the decoded motion vector. Finally, media encoder 200 and/or media decoder 300 may use the skip mode to serve as a cheap (e.g., computationally inexpensive) mechanism to code an identity transform between the current frame and any reference frame in the buffer. For example, such motion may be defined as $$\tilde{x}_t = \alpha \cdot \mathrm{warp}(\hat{x}'_{t-1}, \hat{m}_t) + (1-\alpha) \cdot \hat{x}'_{t-1},$$

where $\tilde{x}_t$ is motion prediction, $$\hat{x}'_{t-1}$$

is a reference frame sampled using the Gumbel-Softmax operator, $\alpha \in [0,1]$ is a skip mode and warp(·) is a bi-linear warping function.

Figure 8:
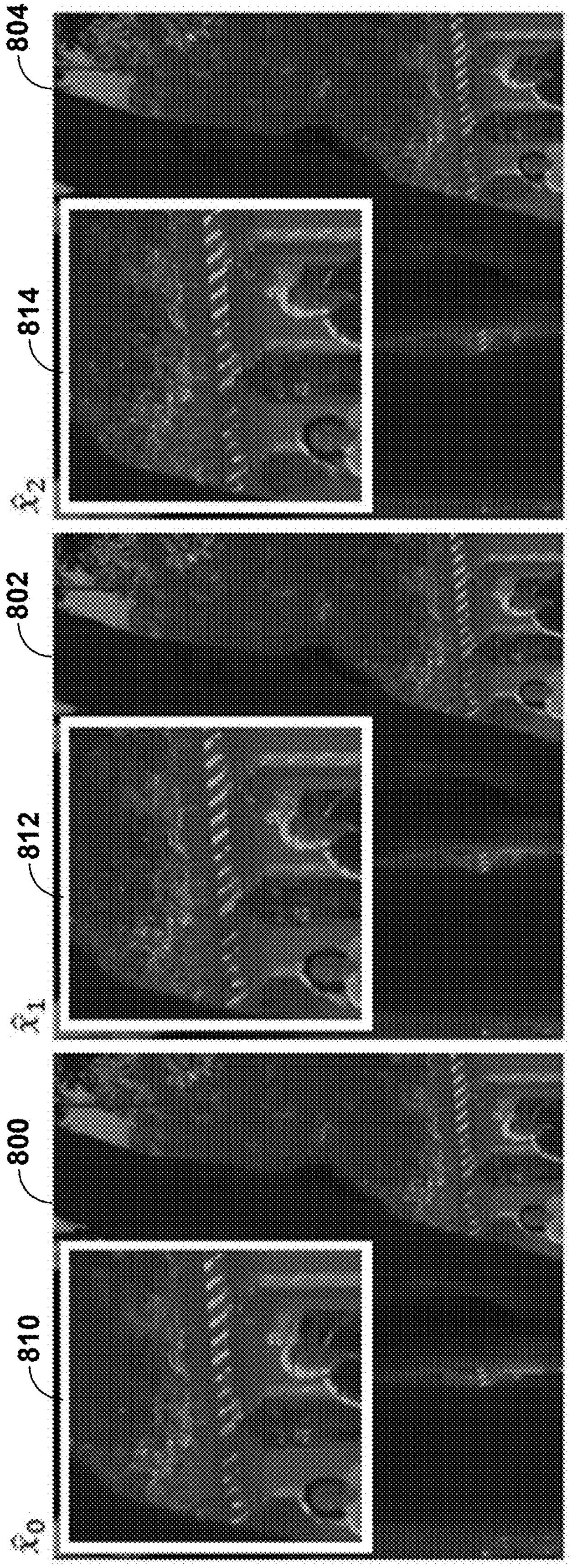
FIG. 8 is a conceptual diagram illustrating an example of a three-frame validation sequence obtained during training.

FIG. 8 is a conceptual diagram illustrating an example of a three-frame validation sequence obtained during training. A three-frame reconstruction on a training validation sequence is depicted. Given a relatively low quality I-frame (e.g., a corrupted I-frame) at t=0, the video model may output reconstructions of progressively improved quality, of frames 800, 802, and 804. Inlays 810, 812, and 814 are provided to show an enlarged version of the foreground area containing people. The result of ARS may be seen in FIG. 8, using a buffer of two frames. For example, media encoder 200 and/or media decoder 300 may select only pixels from the most recent reference frame that exhibit a relatively large amount of motion (e.g., the foreground area containing people).

Minimizing temporal error propagation is now discussed. Practical limitations of time and compute resources may restrict coder training to ≤7 (seven) frames. As such, one of the essential problems endemic to NVCs has been the accumulation of temporal errors over larger test-time GOP sizes (which may include hundreds of frames) on which an NVC cannot practically train. The most popular approach to this issue has been to use a "cascaded" loss (Chan et al., 2021; Sheng et al., 2022). With a cascaded loss, a training system may include a weighted objective where the distortion importance increases as a function of depth in the training sequence. This technique has a dual purpose of penalizing quality deterioration and preventing disproportionate evaluation of early frames (e.g., early frames are implicitly evaluated in all future frames). For example, a model may use:

$$\mathcal{L} = \frac{1}{T}\sum_{t=0}^{T}[R + \alpha_t \lambda D],$$

where R is rate (e.g., bit rate), D is distortion (such as a mean-squared error, PSNR, etc.), T is time step, and $\alpha_t$ is a constant that increases monotonically across the training GOP over time steps.

However, while modified objectives have yielded success in delaying deterioration, the fundamental problem remains: the model struggles to infer the hand-designed rules native to conventional coders for quality preservation over long sequences of frames or pictures. Indeed, even the best of such approaches will still use an I-frame every 32 frames, which is unusual for conventional LD approaches. For example, inserting an I-frame into a bitstream every 32 frames may significantly decrease coding efficiency. I-frames tend to be much more expensive in terms of bandwidth than P-frames, as an I-frame may include all the information of within a frame of video data, rather than a delta of information between a current frame and another frame. In a conventional coder, such as a VVC coder, when there is no scene change, a relatively large number of P-frames may be sent (e.g., 500-600 sequentially) without any intervening I-frames. As such, a NVC sending an I-frame every 32 frames during normal operation is simply not competitive, in terms of bandwidth efficiency, with conventional codecs.

As such, it may be desirable to provide an NVC that does not need to send an I-frame relatively frequently to maintain quality. According to the techniques of this disclosure, a system may train a P-frame model such that the P-frame model learns to perpetually improve picture quality and mimics the removal of temporal errors over large GOP sizes. For example, it may be insufficient to simply penalize temporal errors when training; training should cause the NVC to learn to self-correct those temporal errors the NVC otherwise tends to create. For example, media encoder 200 and/or media decoder 300 may be trained to self-correct temporal errors. Some documents discuss self-supervision techniques (He et al., 2022b; Grill et al., 2020).

In some examples, a model-agnostic training technique (which may be referred to herein as forced quality enhancement (FQE)) may be used to train media encoder 200 and/or media decoder 300. FQE may operate by pre-training a P-frame model using an I-frame subject to some corruption. Such corruption may be inherent in the generated I-frame or applied after the I-frame is generated or both. For example, a corrupt I-frame may be an I-frame generated with a lower PSNR (e.g., significantly lower) than is associated with a Lagrange multiplier used for the P-frame model and/or be an I-frame that may be subject to random masking to introduce corruption (or further corruption).

For example, media encoder 200 and/or media decoder 300 may be trained using a corrupt I-Frame to accumulate improved reconstructions across subsequent training frames, reducing or minimizing the objective subject to the objective subject's own error. While a number of techniques may be effective (including random masking) in subjecting the I-frame to corruption, to best simulate the artifacts of NVCs, an I-frame configured to have a significantly lower PSNR than the Lagrange multiplier of the P-frame model would imply (if the I-frame model would be included in end-to-end training) may be utilized. For example, if the P-frame model is configured to try to maintain a 34 db PSNR at 1000 kbps, the I-frame may be configured to have a 32 db PSNR at 500 kbps. As discussed above, a Lagrange multiplier may be used to balance between rate and distortion. For example, a corrupted I-frame may be configured for 0.25 times the bitrate achieved if an I-frame model were included in end-to-end training. For example, a P-frame model of media encoder 200 and/or media decoder 300 may be trained using a corrupt I-frame, such as an I-frame configured for a PSNR that is lower than (or lower than or equal to) a threshold. This threshold may be based on a Lagrange multiplier associated with the P-frame model. In some examples, the threshold may for example, a 3-frame training sequence as described with respect to FIG. 8 may be utilized.

Further, a system may train media encoder 200 and/or media decoder 300 to learn one of the hand-designed biases of conventional coders: the P-frames oscillate in bitrate (Bossen et al., 2022). For example, a coder may initiate a chain of high-then-low bit-rate P-frame pairs.

Figure 9:
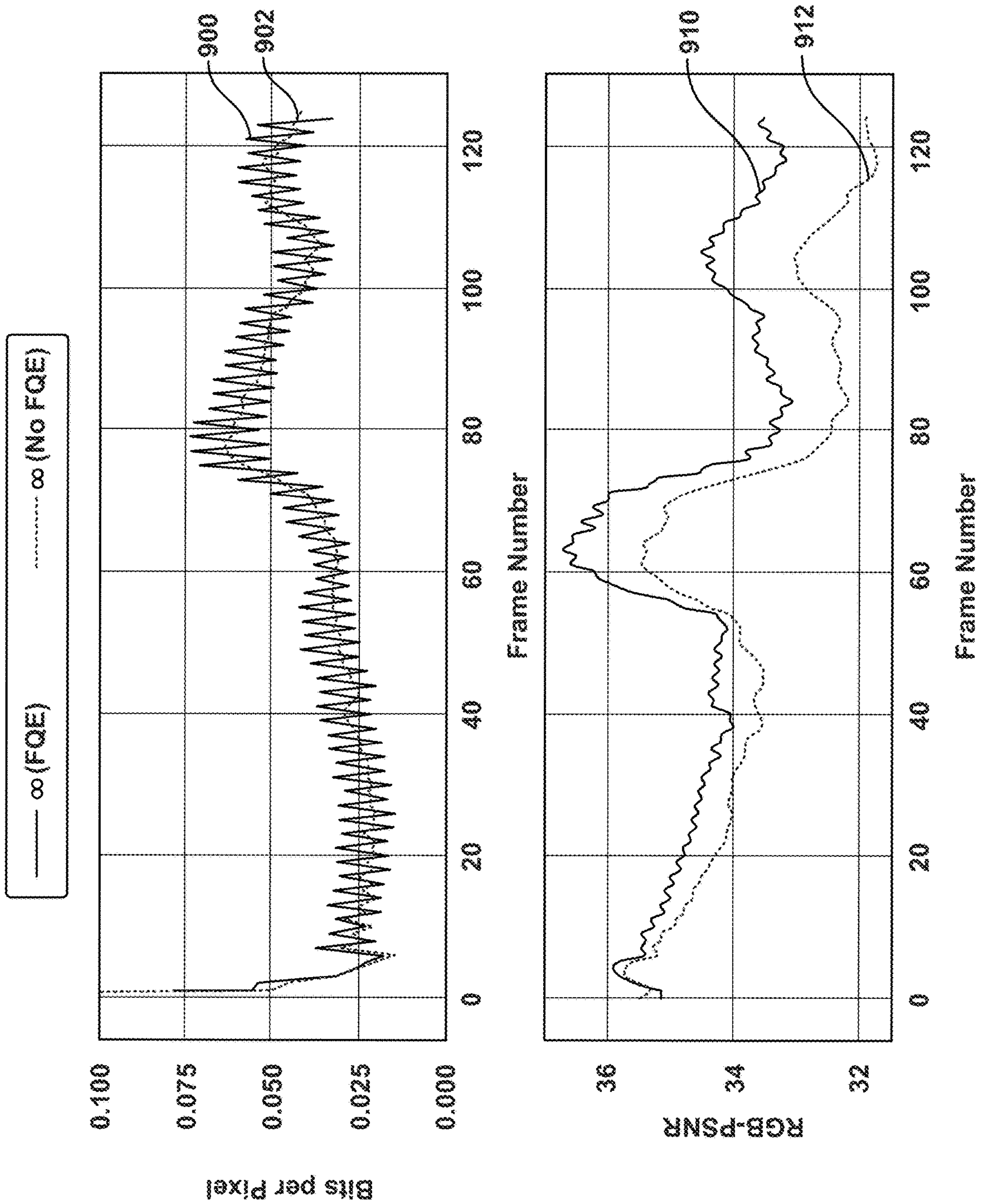
FIG. 9 is a graphic diagram illustrating an example peak signal-to-noise ratio (PSNR) and bits per pixel over 125 evaluation frames with and without forced quality enhancement (FQE).

FIG. 9 is a graphic diagram illustrating an example peak signal-to-noise ratio (PSNR) and bits per pixel over 125 evaluation frames with and without forced quality enhancement (FQE). The example of FIG. 9 depicts the result of the application of FQE (900 and 910) compared with no FQE (902 and 912) for a so-called Infinity GOP across a validation sequence. As shown, the use of FQE results in a reliably higher PSNR, along with the oscillating bits per pixel, than not using FQE. The learned robustness to bad reference frames and missing data is further discussed later in this disclosure.

Techniques for evaluating neural coders are now discussed. In neural image and video compression, typical evaluation will compare rate-distortion performance against conventional coders, such as HEVC and VVC. Within this typical evaluation, there are two commonly used distortion metrics: RGB-PSNR and MS-SSIM. The latter serves as a proxy for optimizing the coder with respect to perceptual losses (Zhang et al., 2018; Blau & Michaeli, 2018; Mentzer et al., 2020). Given the flexibility of NVCs to optimize for any differentiable objective, this is an important demonstration in which NVCs excel.

This disclosure focuses more on the former: "classical" rate-distortion performance defined in RGB-PSNR. This is a metric in which many NVCs described in papers outperform HEVC- and recently, in VVC (Li et al., 2022a). However, this metric may prejudice against conventional baselines. As such, future evaluation against conventional coders may be better accomplished in terms of a weighted YUV-PSNR, the objective function directing development in video standards organizations.

Evaluating coders in RGB is now discussed. Conventional techniques for evaluating coders are not designed for RGB. Instead, these techniques operate in an-often sub-sampled—$YUV_{420}$ color-space. (sub-sampled color-spaces yield an improvement in complexity by exploiting human perception). In order to evaluate coders in RGB, common practice is to perform a transform to $YUV_{444}$, compress the result, and perform the inverse transform to RGB, before evaluating RGB-PSNR.

The absence of chroma sub-sampling and transform operations make precise comparison difficult, but may not be the principal issue. Indeed, like MS-SSIM, conventional coders are not optimized for RGB-PSNR. That is, decades of development have settled on a de facto loss of YUV-PSNR with channel-wise weightings of ~6:1:1 to 8:1:1. In comparison, RGB-PSNR has an approximate equivalence to a YUV-PSNR 1:1:1 (Ström et al., 2020). This observation may have important consequences for rate distortion performance. Specifically, a Y channel possesses the highest entropy and may therefore be hardest or most costly to compress. As such, conventional coders have long experienced a ~1:10 tradeoff in terms of BD rate between Y and UV (Bossen, 2019; Francois et al., 2022): in order to gain 1% BD rate in Y (against some reference), coders may sacrifice 10% in UV.

TABLE 1

BD rate in YUV over an I-frame model trained for RGB-PSNR.

| YUV-PSNR | Y | U | V |
|---|---|---|---|
| 1:1:1 | −0.39% | 2.04% | 3.77% |
| 4:1:1 | −3.47% | 23.86% | 29.17% |
| 8:1:1 | −5.24% | 56.83% | 63.48% |

To better understand the impact of this observation, two points may be considered. First, when NVCs beat conventional baselines in the RGB color space, whether that would also be the result in the YUV color space. Second, to what extent the RGB performance is transferable to YUV—e.g., whether there is a similar Y:UV BD rate trade-off. For question one, public code of Li et al. (2022a), may be evaluated, which may be the only NVC to report outperformance of VTM. To obtain YUV results, the coder may be evaluated across the JVET CTC. An ad-hoc conversion of RGB to YUV—and vice versa may be employed. For question two, the I-frame model (e.g., of media encoder 200 and/or media decoder 300) may be re-trained across three YUV-PSNR targets: 1:1:1, 4:1:1 and 8:1:1. The resulting models may be evaluated on the popular Kodak dataset (Franzen, 1999) using the RGB-trained model as reference.

TABLE 2

| Performance over VTM-16.0 LDP for Li et al. (2022a). | | | |
|---|---|---|---|
| CLASS | Y | U | V |
| CLASS B | 35.92% | −57.72% | −55.80% |
| CLASS C | 34.77% | −52.18% | −52.63% |
| CLASS D | 26.89% | −59.58% | −61.71% |
| CLASS E | 128.73% | 52.41% | 14.18% |

In Table 2, it can be seen that the out-performance of Li et al. (2022a) in 1:1:1 (or RGB) comes from UV. In Table 2, it can be similarly observed that there is a Y: UV trade-off of ~1:10. While it is possible the latter does not generalize to the results of Li et al. (2022a) or other NVCs, these results may evidence an approach optimized for a weighted YUV objective is most likely disadvantaged in RGB-PSNR. It may be further noted that this divergence is broadly consistent with the results presented in Pourreza et al. (2023), which observed weaker comparative performance when working with a similar distortion objective in YUV.

While it may be perceptual quality that ultimately matters (with 6:1:1 PSNR-YUV itself a perceptual choice), an RGB comparison may achieve much the same as MS-SSIM: evidencing flexibility to train for any differentiable objective. NVCs may achieve superior visual quality without a victory in YUV, but the use of RGB-PSNR in the evaluation of "classical" rate-distortion does not appear to fairly compare coders.

Test results are now discussed. Media encoder 200 and media decoder 300 of this disclosure were trained on the Vimeo-90k dataset (Xue et al., 2019). The training followed the multi-stage training formulation proposed in Sheng et al. (2022). For FQE, a frozen I-frame model targeting approximately 0.25 times the bitrate achieved if it were included in training was used. For the post-FQE final training step, the I-frame model was unfrozen and the coder (e.g., media encoder 200 and/or media decoder 300) was trained end-to-end. For evaluation purposes, only one I-frame was used, with all frames subsequent being P-frames.

Conventional coders were omitted from PSNR-RGB comparisons, which would likely be outperformed, and instead the test compared separately using the JVET CTC in $YUV_{420}$. A number of techniques have proposed specialized networks to work with $YUV_{420}$ inputs (Egilmez et al., 2021; Pourreza et al., 2023; Ho et al., 2022). However, there may be no benefit to special treatment. Surprisingly, it appears advantageous to adopt the simplest technique of upsampling UV via repetition before applying an RGB conversion. Such a conversion may normalize the marginal distributions across channels, making network training easier (which is discussed later herein). YUV models were trained with a 6:1:1 YUV-PSNR distortion objective.

TABLE 3

| Ablation results of different model proposals. The BD-rates were computed using UVG. | | |
|---|---|---|
| MODIFICATION | OPTION | BD RATE DIFF. |
| HYPERPRIOR | DCT | 0.00% |
| | BALLE ET AL. | 3.90% |
| CONTEXT | OURS | 0.00% |
| MODEL | LI ET AL. (2022A) | 6.81% |
| FQE | ON | 0.00% |
| | OFF | 21.04% |

TABLE 3-continued

| Ablation results of different model proposals. The BD-rates were computed using UVG. | | |
|---|---|---|
| MODIFICATION | OPTION | BD RATE DIFF. |
| MOTION | COND. + ARS | 0.00% |
| | COND. + No ARS | 2.21% |
| | No COND. | 12.46% |

In Table 3 above, the results of ablations are shown. FQW comfortably presents the single largest improvement, with FQW being broadly applicable to any LD NVC.

To compare media encoder 200 and/or media decoder 300 against other NVCs, video compression was evaluated on popular benchmarks MCL-JCV and UVG (Mercat et al., 2020; Wang et al., 2016) in RGB. For this evaluation, media encoder 200 and/or media decoder 300 were compared to (Hu et al., 2021), ELF-VC (Rippel et al., 2021), DCVC (Li et al., 2021), C2F (Hu et al., 2022), VCT (Mentzer et al., 2022), SSF (Agustsson et al., 2020) and Li et al. (Li et al., 2022a). It may be noted that Li et al. evaluated only the first 96 frames of each sequence, which may make a comparison slightly unreliable.

Figure 10:
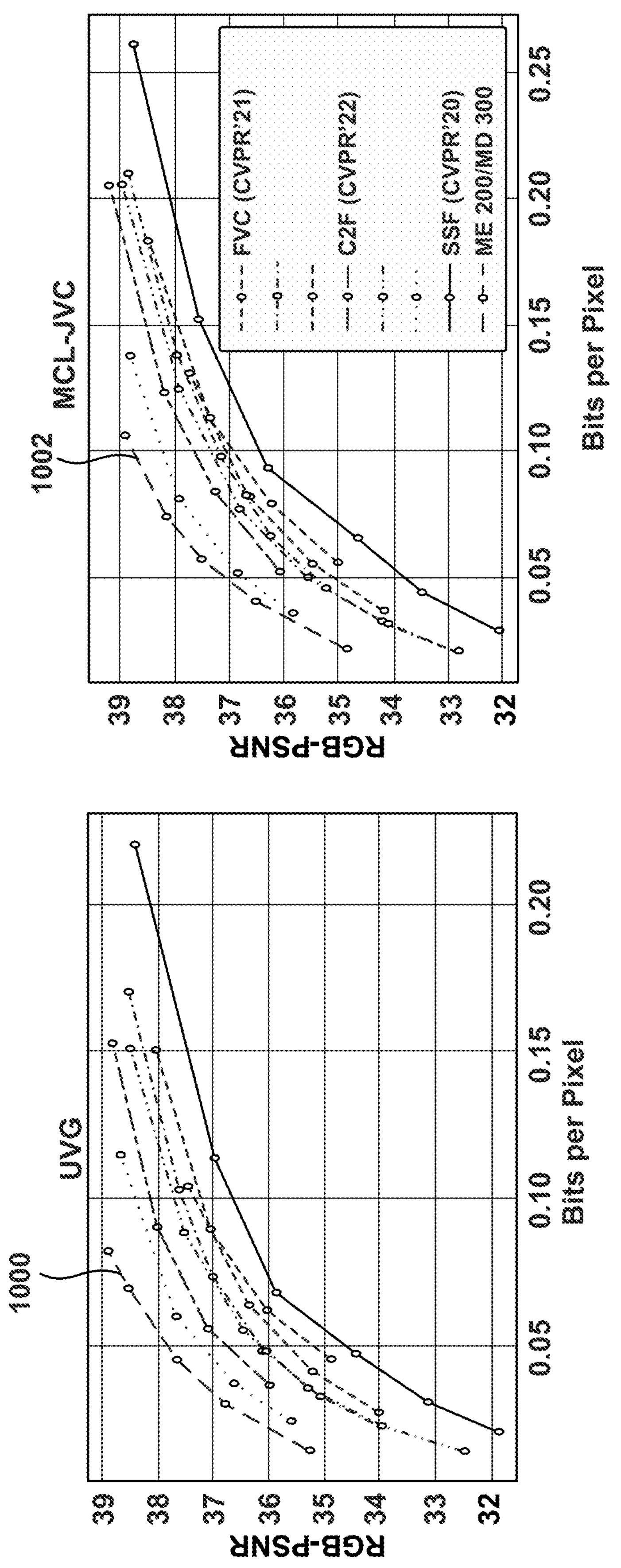
FIG. 10 is a graphic diagram illustrating example RGB rate-distortion curves for the UVG and MCL-JCV datasets.

FIG. 10 is a graphic diagram illustrating example RGB rate-distortion curves for the UVG and MCL-JCV datasets. FIG. 10 depicts test results and may demonstrate out-performance of each of the prior approaches. The curves labeled 1000 and 1002 represent test results for media encoder 200 and/or media decoder 300 employing techniques of this disclosure.

As discussed above, media encoder 200 and/or media decoder 300 were compared against conventional standards in $YUV_{420}$. For this comparison, the HEVC and VVC test models (HM, VTM) were utilized, and evaluated using the JVET CTC. Test results are available in Table 5 and 6. Note the challenges posed by Class E, which is largely composed of static content. Evidently media encoder 200 and/or media decoder 300 struggled to compete against the sophisticated skip modes of conventional approaches selected during RDO (e.g., Wien (2015)). Note that this problem was also faced by Li et al. (2022a) upon evaluating using the public code-base of Li et al. (2022a) (see Table 2). Despite this, media encoder 200 and/or media decoder 300, according to the techniques of this disclosure, are examples of the first reported coder to beat VTM LDP on the majority of test sequences—even outperforming LDP on classes C and D.

TABLE 4

| Performance over HM-16.24 LDP. | | | |
|---|---|---|---|
| CLASS | Y | U | V |
| CLASS B | −36.35% | −31.26% | −38.18% |
| CLASS C | −35.51% | −37.85% | −46.65% |
| CLASS D | −39.54% | −38.57% | −49.20% |
| CLASS E | −8.09% | 20.95% | 2.09% |

TABLE 5

| Performance over VTM-16.0 LDP. | | | |
|---|---|---|---|
| CLASS | Y | U | V |
| CLASS B | −0.11% | −14.41% | −0.57% |
| CLASS C | −10.72% | −23.32% | −33.25% |
| CLASS D | −16.84% | −28.05% | −41.75% |
| CLASS E | 36.64% | 88.66% | 3.29% |

Decoding speed was also evaluated. UVG sequences of 1080p were used. Media encoder 200 and/or media decoder 300 were run on an NVIDIA RTX 5000 and compared against results obtained from papers, where available. Achieving a competitive BD rate and decoding speed performance evidently remains a challenge for NVCs. For example, while ELF-VC is a stand-out approach in terms of FPS, it comes at a large BD disadvantage.

TABLE 6

Estimated FPS and BD rate differences across the UVG dataset. BD rates are calculated with respect to coders of the present disclosure.

| METHOD | FPS ESTIMATE | BD RATE DIFF. |
|---|---|---|
| MEDIA ENCODER 200/ MEDIA DECODER 300 | ≈1.4 | 0.00% |
| LI ET AL. | ≈1.9 | 56.30% |
| C2F | ≈3.4 | 95.14% |
| VCT | ≈1.4 | 147.90% |
| ELF-VC | ≈18.0 | 162.24% |
| FVC | ≈1.8 | 218.22% |

As described herein NVCs (such as media encoder 200 and media decoder 300) can be competitive with state-of-the-art conventional approaches in $YUV_{420}$.

Media encoder 200 and media decoder 300 may be built from a symmetric architecture of 5 residual blocks of 192 channels. For example, hyper-networks may be built out of 2 residual blocks, both of 256 channels. A kernel size of three may be used everywhere and upsampling may be accomplished with transposed convolutions.

A first-level latent variable y may be downsampled a total of 3 times, as compared to the typical 4. For example, this choice, in combination with the content-adaptive quantization bin-size, may present a good balance between exploiting spatial redundancy and retaining high-frequency information.

To demonstrate the learned robustness from FEQ, one may assess the effect of a bad reference frame. In the extreme, this may include the effect of a missing reference frame. For example, media encoder 200 and/or media decoder 300 may be compared to Li et al. (2022a). For each coder, the first 32 frames of UVG sequence HoneyBee may be evaluated, both with and without a missing I-frame (e.g., it is assumed to be a tensor of zeros), at a comparable bitrate. Such an evaluation may yield results in the form of a PSNR difference between the coded sequences with and without I-frames.

Figure 11:
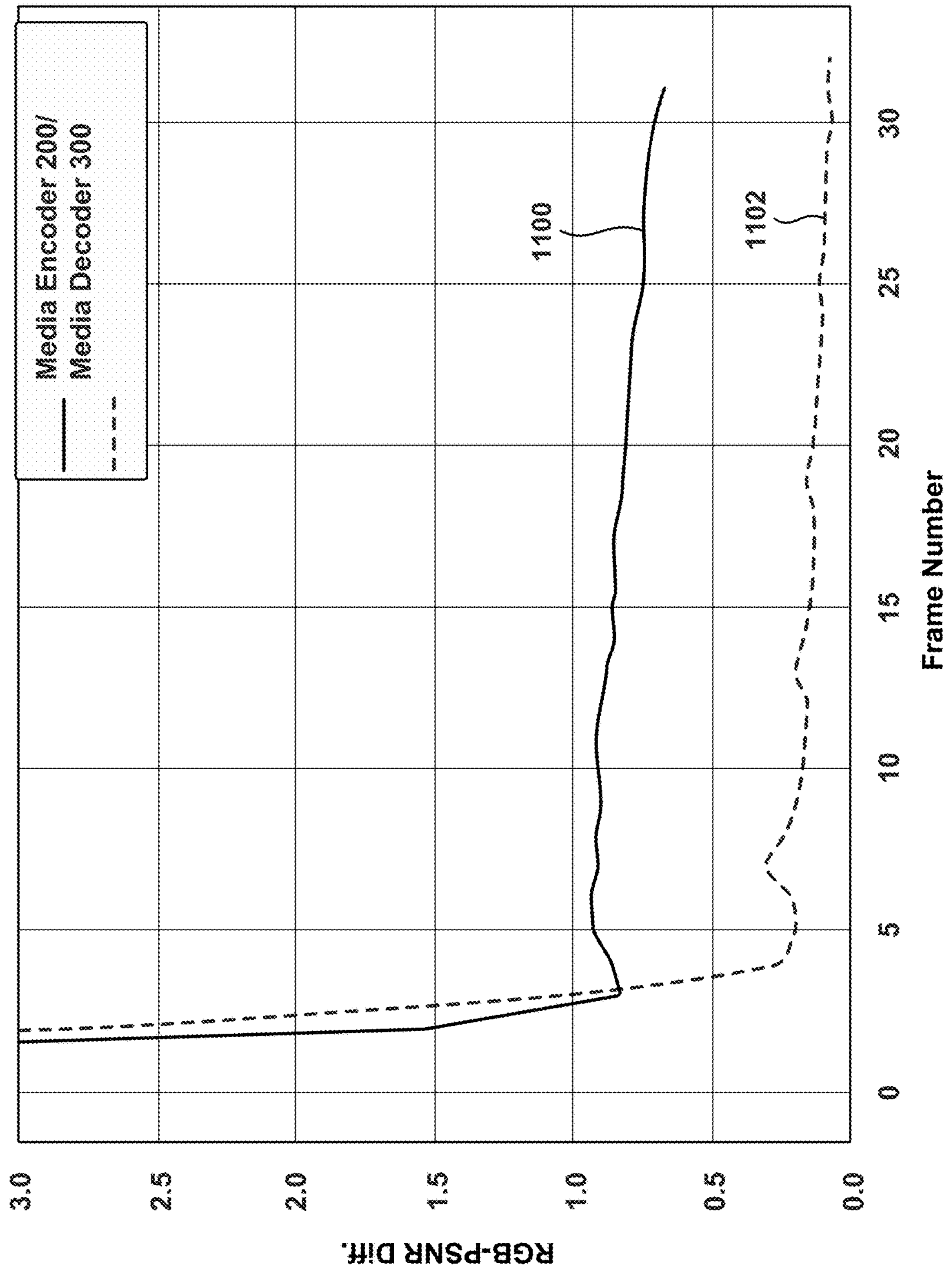
FIG. 11 is a graphic diagram illustrating an example RGB-PSNR difference between validation sequences with and without an I-frame.

FIG. 11 is a graphic diagram illustrating an example RGB-PSNR difference between validation sequences with and without an I-frame. As depicted in FIG. 11, media encoder 200 and/or media decoder 300 (represented by line 1100) recovers relatively quickly to within about 0.1 db without inserting a new I-frame. In contrast, the validation sequence of Li et al. (2022a) (represented by line 1102) is more adversely affected.

Figure 12:
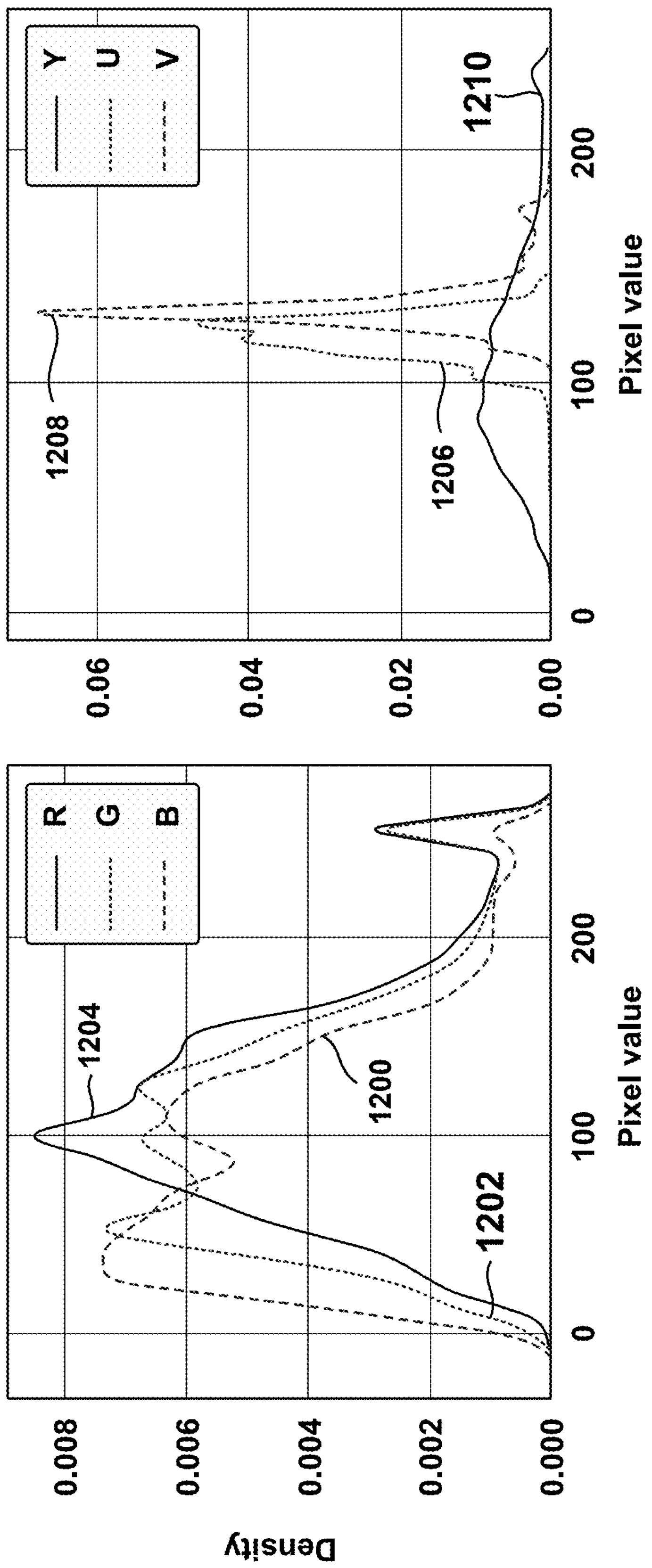
FIG. 12 is a graphic diagram illustrating an example of kernel density estimates of channels across the Kodak dataset in RGB and YUV.

FIG. 12 is a graphic diagram illustrating an example of kernel density estimates of channels across the Kodak dataset in RGB and YUV. In the example of FIG. 12, line 1200 represents B, line 1202 represents G, and line 1204 represents R. Additionally, line 1206 represents U, line 1208 represents V, and line 1210 represents Y. Note the statistical differences between channels in YUV as compared to RGB, which contains much more redundancy. Given the difference resolves to an affine transform, it is surprising that an RGB-transformed YUV input was preferred in tests. Most curiously, operating on YUV input directly (using a non-learned upsampling for UV in 420) was one of the least performant choices. Note that prior work in the YUV space adopts separate network "heads": one for Y and one for UV (Pourreza et al., 2023; Egilmez et al., 2021). More broadly, however, $YUV_{420}$ is designed to save computation in conventional coders. Use of separate heads potentially achieves the opposite. Further note that an RGB conversion allows use for a pre-trained optical flow model, which may simplify training.

Figure 13:
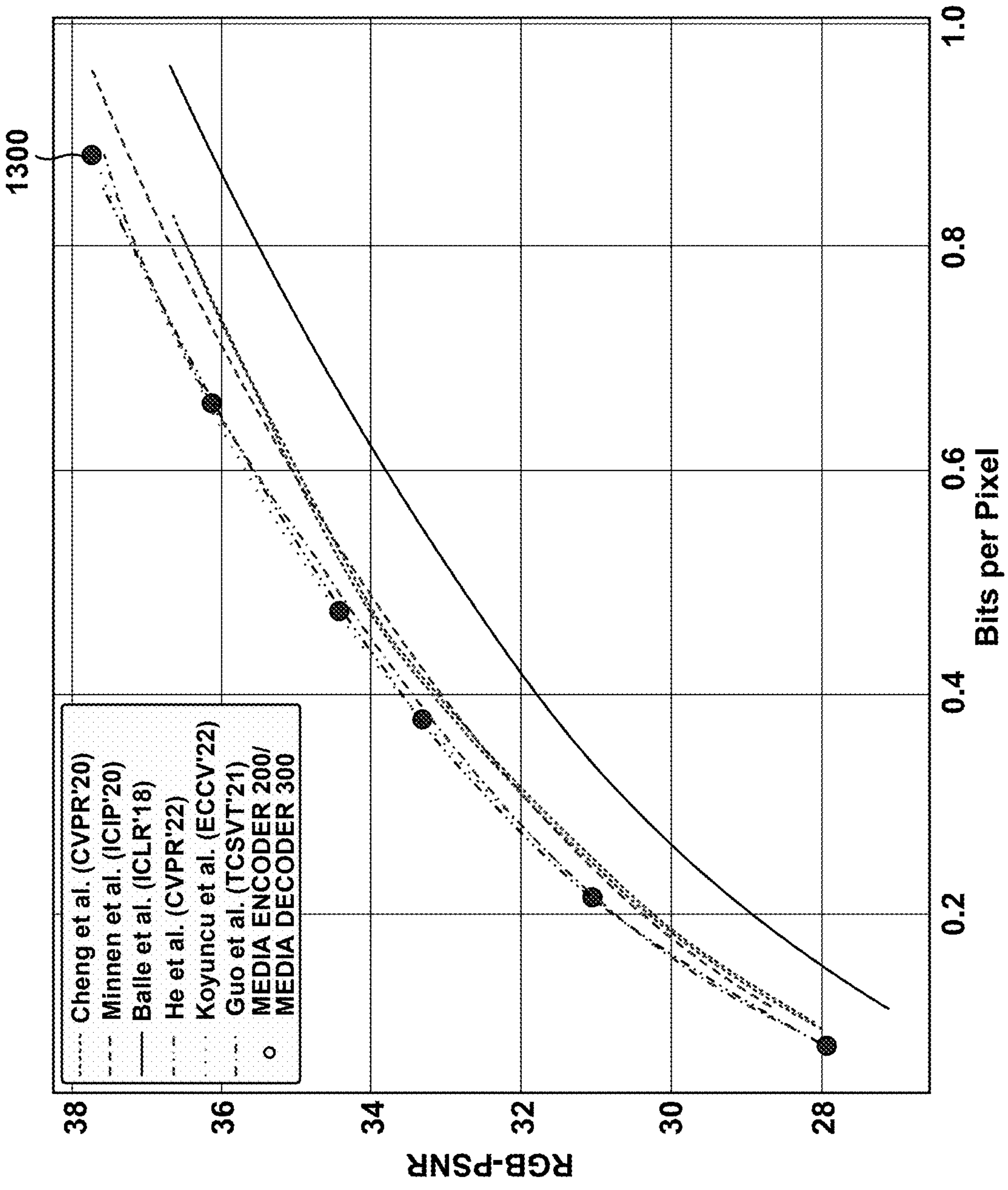
FIG. 13 is a graphic diagram illustrating example RGB rate-distortion curves for the Kodak dataset.

FIG. 13 is a graphic diagram illustrating example RGB rate-distortion curves for the Kodak dataset. In FIG. 13, dots, such as dot 1300, represent data for media encoder 200 and/or media decoder 300 implementing one or more techniques of this disclosure.

Figure 14:
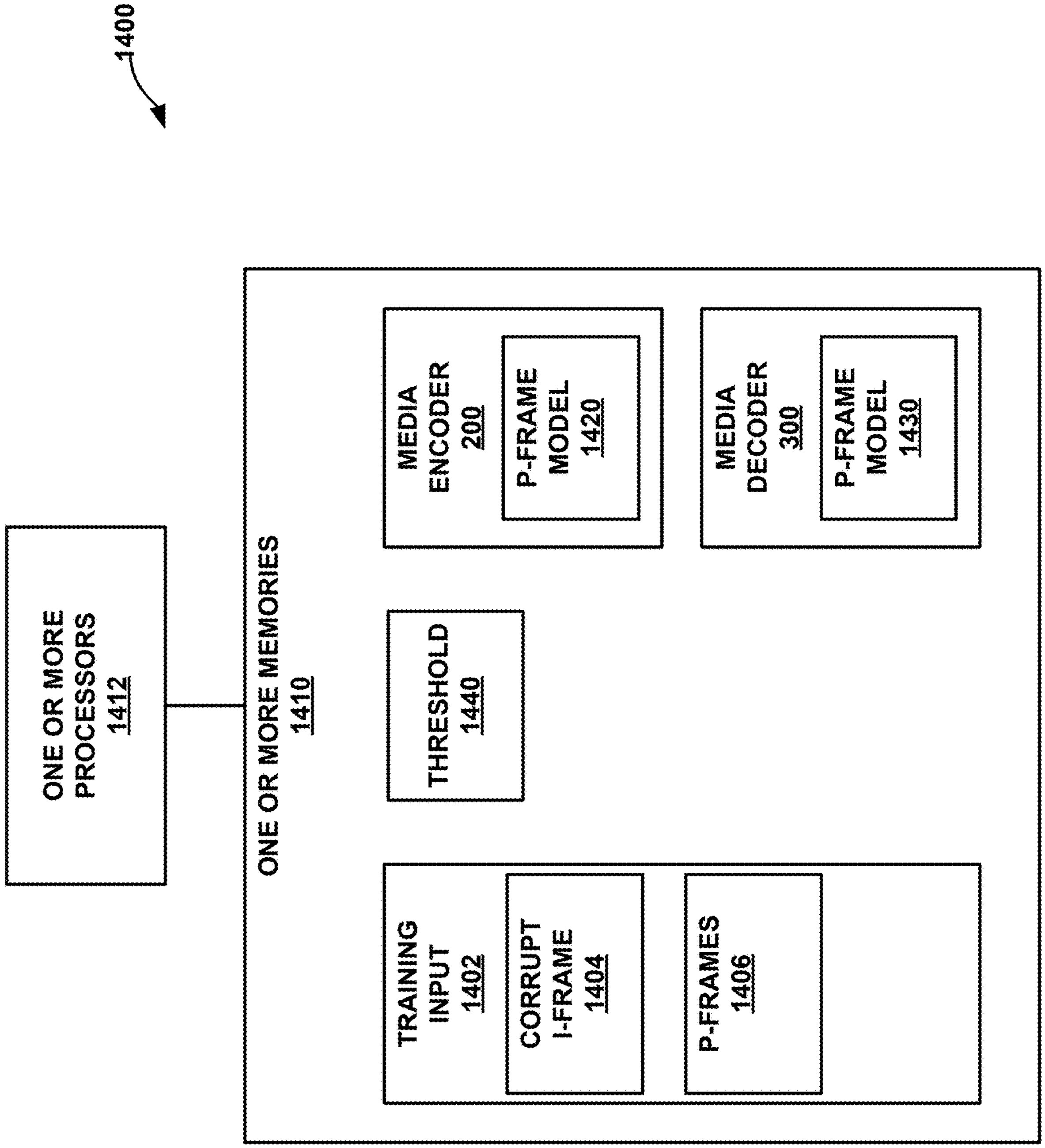
FIG. 14 is a block diagram illustrating an example system for training a P-frame model according to one or more aspects of this disclosure.

FIG. 14 is a block diagram illustrating an example system for training a P-frame model according to one or more aspects of this disclosure. Training system 1400 may include one or more processors 1412 coupled to one or more memories 1410. One or more memories 1410 may store training input 1402, threshold 1440, media encoder 200, and/or media decoder 300. In some examples, training system 1400 may be part of source device 102 and/or destination device 116 of FIG. 1. In some examples, training system 1400 may be a separate system from source device 102 and/or destination device 116. For example, training system 1400 may be used to train media encoder 200 and/or media decoder 300 prior to media encoder 200 and/or media decoder being deployed to source device 102 and/or destination device 116, respectively.

Media encoder 200 may include a P-frame model 1420 and media decoder 300 may include a P-frame model 1530. In some examples, P-frame model 1420 and P-frame model 1430 include a same P-frame model.

Training input 1402 may include a corrupt I-frame 1404. Corrupt I-frame 1404 may include an I-frame that has a PSNR that meets threshold 1440 (e.g., is lower than or lower than or equal to threshold 1440) and/or include one or more areas of inserted errors. In some examples, threshold 1440 may be based on a Lagrange multiplier associated with P-frame model 1420 and/or 1430. In some examples, corrupt I-frame 1404 may include purposefully inserted errors, such as one or more areas of blocked out data. In other examples, corrupt I-frame 1404 may include naturally occurring inserted errors.

In some examples, one or more processors 1412 may be configured to generate corrupt I-frame 1404. For example, one or more processors 1412 may be configured to generate an I-frame meeting threshold 1440 and/or to insert errors into one or more areas of an I-frame.

Training input 1402 may also include P-frames 1406. For example, P-frames 1406 may include a number of P-frames (e.g., up to 7 P-frames) which may be used to train P-frame model 1420 and/or 1430. P-frames 1406 need not be corrupt P-frames.

One or more processors 1412 may be configured to train P-frame model 1420 and/or 1430 using corrupt I-frame 1404 and P-frames 1406.

Figure 15:
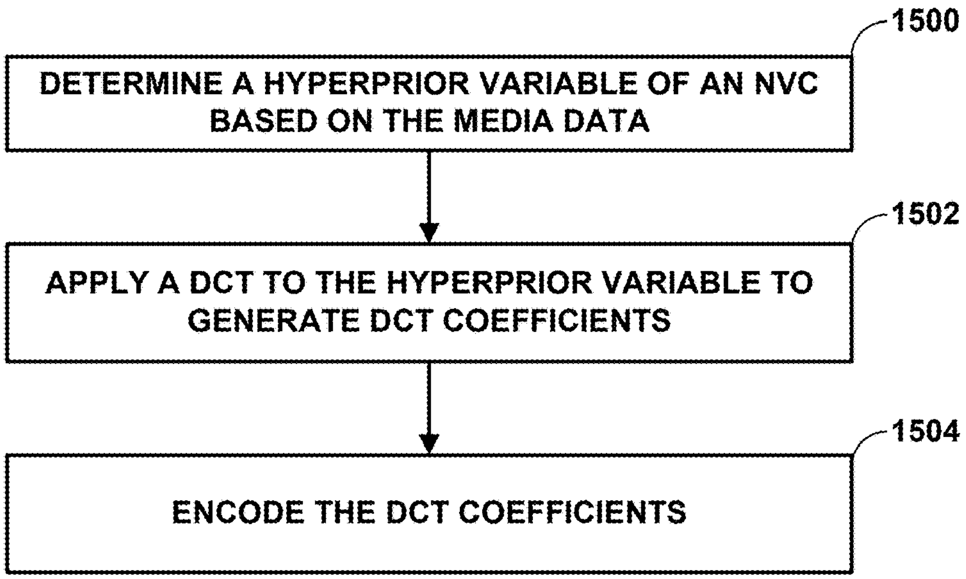
FIG. 15 is a flow diagram illustrating example techniques for encoding media data according to one or more aspects of this disclosure.

FIG. 15 is a flow diagram illustrating example techniques for encoding media data according to one or more aspects of this disclosure. Media encoder 200 may determine a hyperprior variable of an NVC based on the media data (1500). For example, media encoder 200 may execute hyperprior encoder neural network 404 (FIG. 3A) of an NVC to determine a hyperprior variable based on input image 400. Media encoder 200 may apply a DCT to the hyperprior variable to generate DCT coefficients (1502). For example, media encoder 200 may apply DCT process 405 to the hyperprior variable to generate DCT coefficients. Media encoder 200 may encode the DCT coefficients (1504). For example, media encoder 200 may quantize via quantization process 406 and entropy encode via entropy encoding 408 the DCT coefficients as part of encoding the media data.

In some examples, as part of encoding the DCT coefficients, media encoder 200 may quantize channel-wise parametric mixture of the DCT coefficients to generate quantized DCT coefficients. In some examples, as part of encoding the DCT coefficients, media encoder 200 may entropy encode the quantized DCT coefficients. In some examples, the channel-wise parametric mixture includes a channel-wise 4×4 parametric mixture.

In some examples, the hyperprior variable includes a hyperprior variable of an I-frame model of the NVC. In some examples, the hyperprior variable comprises a hyperprior variable of a P-frame model of the NVC. In some examples, the P-frame model includes at least one of a motion estimation model or a conditional coder model. In some examples, the P-frame model is trained using a corrupt I-frame having at least one of a) a peak signal-to-noise ratio (PSNR) that meets a threshold or b) one or more areas of inserted errors.

In some examples, the hyperprior variable is based on a latent variable. In some examples, media encoder 200 may determine the latent variable, and wherein as part of determining the latent variable, media encoder 200 may apply context modeling to the media data using an unevenly spaced sub-sampled checkerboard. In some examples, as part of using the unevenly spaced subsampled checkerboard, media encoder 200 may stack shifted copies of N×N masks. In some examples, the media data included video data.

Figure 16:
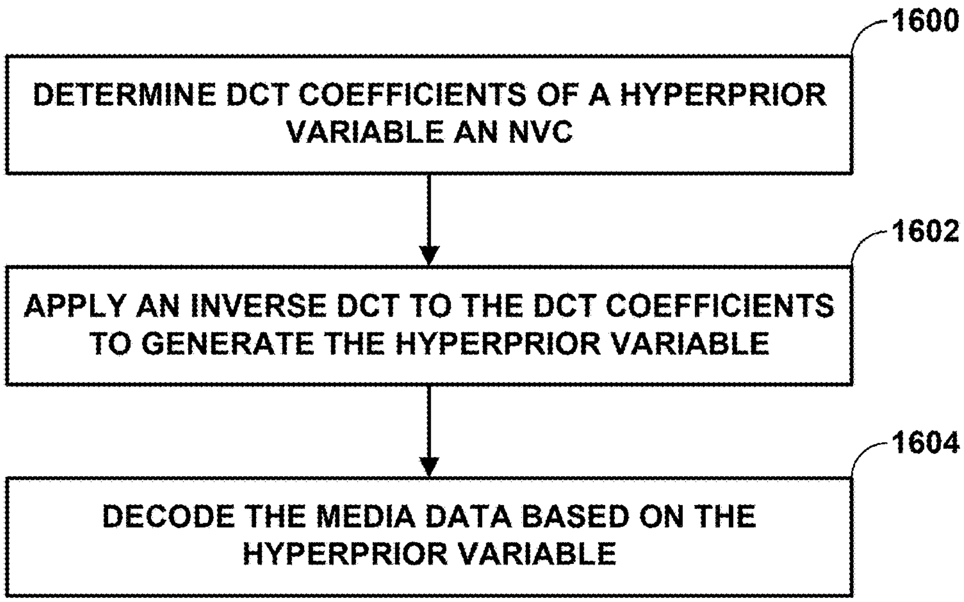
FIG. 16 is a flow diagram illustrating example techniques for decoding media data according to one or more aspects of this disclosure.

FIG. 16 is a flow diagram illustrating example techniques for decoding media data according to one or more aspects of this disclosure. Media decoder 300 may determine DCT coefficients of a hyperprior variable of an NVC (1600). For example, media decoder 300 may obtain entropy encoded DCT coefficients from a bit stream, such as bit stream 1 410 (FIG. 3A) and entropy decode the entropy encoded DCT coefficients (similar to entropy decoding process 412 of FIG. 3A) to determine the DCT coefficients. Media decoder 300 may apply an inverse DCT to the DCT coefficients to generate the hyperprior variable (1602). For example, media decoder 300 may apply an inverse DCT like IDCT process 423 (FIG. 3A) to the entropy decoded DCT coefficients to determine the hyperprior variable. Media decoder 300 may decode the media data based on the hyperprior variable (1604). For example, media decoder 300 may apply a hyperprior decoder neural network, such as hyperprior decoder neural network 424 (FIG. 3A) as part of decoding the media data based on the hyperprior variable.

In some examples, the DCT coefficients include a quantized a channel-wise parametric mixture of DCT coefficients generated by a neural media encoder. In some examples, the channel-wise parametric mixture comprises a channel-wise 4×4 parametric mixture. In some examples, as part of determining the DCT coefficients, media decoder 300 may entropy decode the DCT coefficients.

In some examples, the hyperprior variable includes a hyperprior variable of an I-frame model of the neural video coder. In some examples, the hyperprior variable includes a hyperprior variable of a P-frame model of the neural video decoder. In some examples, the P-frame model includes at least one of a motion estimation model or a conditional coder model. In some examples, the P-frame model is trained using a corrupt I-frame having at least one of a) a peak signal-to-noise ratio (PSNR) that meets a threshold or b) one or more areas of inserted errors.

In some examples, the hyperprior variable is based on a latent variable. In some examples, as part of decoding the media data, media decoder 300 may determine the latent variable, and apply context modeling to the latent variable using an unevenly spaced sub-sampled checkerboard. In some examples, as part of using the unevenly spaced sub-sampled checkerboard, media decoder 300 may stack shifted copies of N×N masks.

In some examples, media decoder 300 may divide latent variable data into a plurality of groups. The latent variable data may include the latent variable. In such examples, media decoder 300 may decode a first percentage of the latent variable data with a first group of the plurality of groups. Media decoder 300 may decode a second percentage of the latent variable data with a second group of the plurality of groups. Media decoder 300 may decode a third percentage of the latent variable data with a third group of the plurality of groups. In some examples, the first percentage and the second percentage are lower than the third percentage. In some examples, the first percentage is 25%, the second percentage is 25%, and the third percentage is 50%.

In some examples, the media data includes video data.

Figure 17:
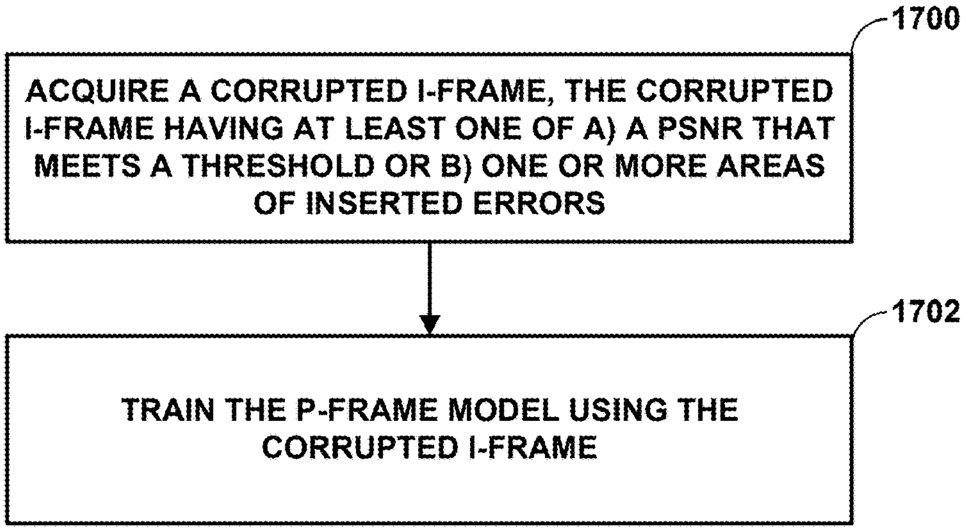
FIG. 17 is a flow diagram illustrating example techniques for training a P-frame model according to one or more aspects of this disclosure.

FIG. 17 is a flow diagram illustrating example techniques for training a P-frame model according to one or more aspects of this disclosure. One or more processors 1412 may acquire a corrupt I-frame, the corrupt I-frame having at least one of a) a peak signal-to-noise ratio (PSNR) that meets a threshold or b) one or more areas of inserted errors (1700). For example, one or more processors 1412 may retrieve corrupt I-frame 1404 from one or more memories 1410. Corrupt I-frame 1404 may have a PSNR that meets threshold 1440 and/or one or more areas of inserted errors.

One or more processors 1412 may train the P-frame model using the corrupt I-frame (1702). For example, one or more processors 1412 may utilize corrupt I-frame 1404 as input to train P-frame model 1420 and/or P-frame model 1430.

In some examples, one or more processors 1412 may generate corrupt I-frame 1404. In some examples, corrupt I-frame 1404 has a PSNR that meets the threshold and wherein to meet the threshold, the PSNR is lower than the threshold or lower than or equal to the threshold. In some examples, the threshold is based on a Lagrange multiplier associated with the P-frame model. In some examples, the corrupt I-frame is pre-configured to meet the threshold. In some examples, training the P-frame model includes training the P-frame model for less than or equal to seven frames. In some examples, training the P-frame model includes training the P-frame model for three frames.

Figure 18:
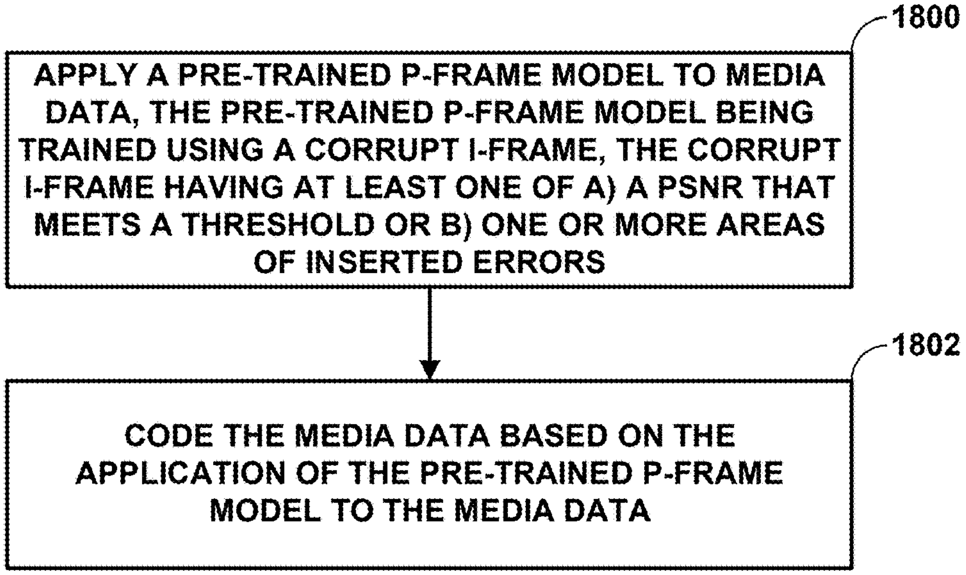
FIG. 18 is a flow diagram illustrating example techniques for coding media data using a trained a P-frame model according to one or more aspects of this disclosure.

FIG. 18 is a flow diagram illustrating example techniques for coding media data using a trained a P-frame model according to one or more aspects of this disclosure. Media encoder 200 or media decoder 300 may apply a pre-trained P-frame model to media data, the pre-trained P-frame model being trained using a corrupt I-frame, the corrupt I-frame having at least one of a) a peak signal-to-noise ratio (PSNR) that meets a threshold or b) one or more areas of inserted errors (1800). For example, media encoder 200 may include P-frame model 1420 which may be pre-trained, e.g., by one or more processors 1412 using corrupt I-frame 1404. Corrupt I-frame 1404 may have a PSNR that meets a threshold and/or one or more areas of inserted errors.

Media encoder 200 or media decoder 300 may code the media data based on the application of the pre-trained P-frame model to the media data (1802). For example, media encoder 200 may encode the media data and media decoder 300 may decode the media data using the pre-trained P-frame model.

In some examples, the corrupt I-frame has a PSNR that meets the threshold and to meet the threshold, the PSNR is lower than the threshold or lower than or equal to the threshold. In some examples, the media data includes video data. In some examples, coding includes encoding. In some examples, coding includes decoding.

The following is a list of references that may have been referred to above.

Agustsson, E. and Theis, L. Universally quantized neural compression. Advances in neural information processing systems, 33:12367-12376, 2020.

Agustsson, E., Minnen, D., Johnston, N., Balle, J., Hwang, S. J., and Toderici, G. Scale-space flow for end-to-end optimized video compression. In Proceedings of the IEEE/CVF Conference on Computer Vision and Pattern Recognition, pp. 8503-8512, 2020.

Ballé, J., Laparra, V., and Simoncelli, E. P. Density modeling of images using a generalized normalization transformation. arXiv preprint arXiv: 1511.06281, 2015.

Ballé, J., Minnen, D., Singh, S., Hwang, S. J., and Johnston, N. Variational image compression with a scale hyperprior. arXiv preprint arXiv: 1802.01436, 2018.

Bjontegaard, G. Calculation of average PSNR differences between RD-curves. VCEG-M33, 2001.

Blau, Y. and Michaeli, T. The perception-distortion tradeoff. In Proceedings of the IEEE conference on computer vision and pattern recognition, pp. 6228-6237, 2018.

Bossen, F. On reporting combined yuv bd rates. Joint Video Experts Team (JVET) of ITU-T SG 16 WP 3 and ISO/IEC JTC 1/SC29, JVET-N0341, 2019.

Bossen, F., Li, X., Sharman, K., Seregin, V., and Sühring, K. VTM and HM common test conditions and software reference configurations for SDR 4:2:0 10-bit video. Joint Video Experts Team (JVET) of ITU-T SG 16WP3 and ISO/IEC JTC 1/SC29, JVET-Y2010, 2022.

Bross, B., Wang, Y.-K., Ye, Y., Liu, S., Chen, J., Sullivan, G. J., and Ohm, J. R. Overview of the versatile video coding (VVC) standard and its applications. IEEE Transactions on Circuits and Systems for Video Technology, 31(10): 3736-3764, 2021. doi: 10.1109/TCSVT.2021.3101953.

Chan, K. C., Wang, X., Yu, K., Dong, C., and Loy, C. C. Basicvsr: The search for essential components in video super-resolution and beyond. In Proceedings of the IEEE/CVF Conference on Computer Vision and Pattern Recognition, pp. 4947-4956, 2021.

Chen, H., He, B., Wang, H., Ren, Y., Lim, S. N., and Shrivastava, A. NERV: Neural representations for videos. Advances in Neural Information Processing Systems, 34:21557-21568, 2021.

Cheng, Z., Sun, H., Takeuchi, M., and Katto, J. Learned image compression with discretized gaussian mixture likelihoods and attention modules. In Proceedings of the IEEE/CVF Conference on Computer Vision and Pattern Recognition, pp. 7939-7948, 2020. Djelouah, A., Campos, J., Schaub-Meyer, S., and Schroers, C. Neural interframe compression for video coding. In Proceedings of the IEEE/CVF International Conference on Computer Vision, pp. 6421-6429, 2019.

Duan, Q., Li, X., Yin, Q., Feng, L., Zhao, J., Teng, Y., Duan, X., Zhao, Y., Gao, M., Wang, J., et al. A study on the generalized normalization transformation activation function in deep learning based image compression. In Proceedings of Sixth International Congress on Information and Communication Technology, pp. 351-359. Springer, 2022.

Egilmez, H. E., Singh, A. K., Coban, M., Karczewicz, M., Zhu, Y., Yang, Y., Said, A., and Cohen, T. S. Transform network architectures for deep learning based end-to-end image/video coding in subsampled color spaces. IEEE Open Journal of Signal Processing, 2:441-452, 2021. doi: 10.1109/OJSP.2021.3092257.

Francois, E., Chen, Y., and Salmon-Legagneur, C. Adjusting luman/chroma BD-rate balance in ECM. Joint Video Experts Team (JVET) of ITU-T SG 16 WP 3 and ISO/IEC JTC 1/SC29, JVET-AC0138, 2022.

Franzen, R. Kodak lossless true color image suite. source: http://rOk.us/graphics/kodak, 4(2), 1999.

Granziol, D., Wan, X., Albanie, S., and Roberts, S. Iterative averaging in the quest for best test error. arXiv preprint arXiv: 2003.01247, 2020.

Granziol, D., Zohren, S., and Roberts, S. Learning rates as a function of batch size: A random matrix theory approach to neural network training. J. Mach. Learn. Res, 23:1-65, 2022.

Grill, J.-B., Strub, F., Altché, F., Tallec, C., Richemond, P., Buchatskaya, E., Doersch, C., Avila Pires, B., Guo, Z., Gheshlaghi Azar, M., et al. Bootstrap your own latent-a new approach to self-supervised learning. Advances in neural information processing systems, 33:21271-21284, 2020.

Guo, Z., Zhang, Z., Feng, R., and Chen, Z. Causal contextual prediction for learned image compression. IEEE Transactions on Circuits and Systems for Video Technology, 32(4):2329-2341, 2021a.

Guo, Z., Zhang, Z., Feng, R., and Chen, Z. Soft then hard: Rethinking the quantization in neural image compression. In International Conference on Machine Learning, pp. 3920-3929. PMLR, 2021b.

Habibian, A., Rozendaal, T. v., Tomczak, J. M., and Cohen, T. S. Video compression with rate-distortion autoencoders. In Proceedings of the IEEE/CVF International Conference on Computer Vision, pp. 7033-7042, 2019. He, D., Zheng, Y., Sun, B., Wang, Y., and Qin, H. Checkerboard context model for efficient learned image compression. In Proceedings of the IEEE/CVF Conference on Computer Vision and Pattern Recognition, pp. 14771-14780,2021.

He, D., Yang, Z., Peng, W., Ma, R., Qin, H., and Wang, Y. Elic: Efficient learned image compression with unevenly grouped space-channel contextual adaptive coding. In Proceedings of the IEEE/CVF Conference on Computer Vision and Pattern Recognition, pp. 5718-5727, 2022a.

He, K., Chen, X., Xie, S., Li, Y., Dollar, P., and Girshick, R. Masked autoencoders are scalable vision learners. In Proceedings of the IEEE/CVF Conference on Computer Vision and Pattern Recognition, pp. 16000-16009, 2022b.

Ho, Y.-H., Lin, C.-H., Chen, P.-Y., Chen, M.-J., Chang, C.-P., Peng, W.-H., and Hang, H.-M. Learned video compression for YUV 4:2:0 content using flow-based conditional interframe coding. In 2022 IEEE International Symposium on Circuits and Systems (ISCAS), pp. 829-833. IEEE, 2022.

Hu, Z., Chen, Z., Xu, D., Lu, G., Ouyang, W., and Gu, S. Improving deep video compression by resolution-adaptive flow coding. In European Conference on Computer Vision, pp. 193-209. Springer, 2020.

Hu, Z., Lu, G., and Xu, D. Fvc: A new framework towards deep video compression in feature space. In Proceedings of the IEEE/CVF Conference on Computer Vision and Pattern Recognition, pp. 1502-1511, 2021.

Hu, Z., Lu, G., Guo, J., Liu, S., Jiang, W., and Xu, D. Coarse-to-fine deep video coding with hyperprior-guided mode prediction. In Proceedings of the IEEE/CVF Conference on Computer Vision and Pattern Recognition, pp. 5921-5930, 2022.

Ioffe, S. and Szegedy, C. Batch normalization: Accelerating deep network training by reducing internal covariate shift. In International conference on machine learning, pp. 448-456. PMLR, 2015.

Izmailov, P., Podoprikhin, D., Garipov, T., Vetrov, D., and Wilson, A. G. Averaging weights leads to wider optima and better generalization. arXiv preprint arXiv: 1803.05407, 2018.

Koyuncu, A. B., Gao, H., Boev, A., Gaikov, G., Alshina, E., and Steinbach, E. Contextformer: A transformer with spatio-channel attention for context modeling in learned image compression. In European Conference on Computer Vision, pp. 447-463. Springer, 2022.

Ladune, T. and Philippe, P. Aivc: Artificial intelligence based video codec. arXiv preprint arXiv: 2202.04365, 2022. Ladune, T., Philippe, P., Hamidouche, W., Zhang, L., and Déforges, O. Conditional coding for flexible learned video compression. arXiv preprint arXiv: 2104.07930, 2021.

Lee, J., Cho, S., and Beack, S.-K. Context-adaptive entropy model for end-to-end optimized image compression. arXiv preprint arXiv: 1809.10452, 2018.

Lee, J. C., Rho, D., Ko, J. H., and Park, E. FFNeRV: Flow-guided frame-wise neural representations for videos. arXiv preprint arXiv: 2212.12294, 2022.

Li, J., Li, B., and Lu, Y. Deep contextual video compression. Advances in Neural Information Processing Systems, 34:18114-18125, 2021.

Li, J., Li, B., and Lu, Y. Hybrid spatial-temporal entropy modelling for neural video compression. In Proceedings of the 30th ACM International Conference on Multimedia, pp. 1503-1511, 2022a.

Li, Y., Wei, C., and Ma, T. Towards explaining the regularization effect of initial large learning rate in training neural networks. Advances in Neural Information Processing Systems, 32, 2019.

Li, Z., Wang, M., Pi, H., Xu, K., Mei, J., and Liu, Y. E-NeRV: Expedite neural video representation with disentangled spatial-temporal context. In European Conference on Computer Vision, pp. 267-284. Springer, 2022b.

Lin, J., Liu, D., Li, H., and Wu, F. M-LVC: Multiple frames prediction for learned video compression. In Proceedings of the IEEE/CVF Conference on Computer Vision and Pattern Recognition, pp. 3546-3554, 2020.

Lu, G., Ouyang, W., Xu, D., Zhang, X., Cai, C., and Gao, Z. Dvc: An end-to-end deep video compression framework. In Proceedings of the IEEE/CVF Conference on Computer Vision and Pattern Recognition, pp. 11006-11015, 2019.

Mentzer, F., Toderici, G. D., Tschannen, M., and Agustsson, E. High-fidelity generative image compression. Advances in Neural Information Processing Systems, 33:11913-11924, 2020.

Mentzer, F., Toderici, G., Minnen, D., Hwang, S.-J., Caelles, S., Lucic, M., and Agustsson, E. Vct: A video compression transformer. arXiv preprint arXiv: 2206.07307, 2022.

Mercat, A., Viitanen, M., and Vanne, J. UVG dataset: 50/120 fps 4 k sequences for video codec analysis and development. In Proceedings of the 11th ACM Multimedia Systems Conference, pp. 297-302, 2020.

Minnen, D. and Singh, S. Channel-wise autoregressive entropy models for learned image compression. In 2020 IEEE International Conference on Image Processing (ICIP), pp. 3339-3343. IEEE, 2020. Minnen, D., Ballé, J., and Toderici, G. D. Joint autoregressive and hierarchical priors for learned image compression. Ad-vances in neural information processing systems, 31, 2018.

Nesterov, Y. Introductory lectures on convex optimization: A basic course, volume 87. Springer Science & Business Media, 2003.

Papyan, V. The full spectrum of deepnet hessians at scale: Dynamics with SGD training and sample size. arXiv preprint arXiv: 1811.07062, 2018.

Pessoa, J., Aidos, H., Tomás, P., and Figueiredo, M. A. End-to-end learning of video compression using spatiotemporal autoencoders. In 2020 IEEE Workshop on Signal Processing Systems (SiPS), pp. 1-6. IEEE, 2020.

Pourreza, R. and Cohen, T. Extending neural P-frame codecs for B-frame coding. In Proceedings of the IEEE/CVF International Conference on Computer Vision, pp. 6680-6689, 2021.

Pourreza, R., Le, H., Said, A., Sautiere, G., and Wiggers, A. Boosting neural video codecs by exploiting hierarchical redundancy. In Proceedings of the IEEE/CVF Winter Conference on Applications of Computer Vision, pp. 5355-5364, 2023.

Ranjan, A. and Black, M. J. Optical flow estimation using a spatial pyramid network. In Proceedings of the IEEE conference on computer vision and pattern recognition, pp. 4161-4170, 2017.

Rippel, O., Anderson, A. G., Tatwawadi, K., Nair, S., Lytle, C., and Bourdev, L. Elf-vc: Efficient learned flexible-rate video coding. In Proceedings of the IEEE/CVF International Conference on Computer Vision, pp. 14479-14488, 2021.

Santurkar, S., Tsipras, D., Ilyas, A., and Madry, A. How does batch normalization help optimization? Advances in neural information processing systems, 31, 2018.

Sheng, X., Li, J., Li, B., Li, L., Liu, D., and Lu, Y. Temporal context mining for learned video compression. IEEE Transactions on Multimedia, 2022.

Ström, J., Andersson, K., Sjöberg, R., Segall, A., Bossen, F., Sullivan, G., Ohm, J.-R., and Tourapis, A. Working practices using objective metrics for evaluation of video coding efficiency experiments (draft 4). Joint Video Experts Team (JVET) of ITU-TSG 16 WP 3 and ISO/IEC JTC 1/SC29, JVET-T2016, 2020.

Sullivan, G. J. and Wiegand, T. Rate-distortion optimization for video compression. IEEE signal processing magazine, 15(6): 74-90,1998. Sullivan, G. J., Ohm, J.-R., Han, W.-J., and Wiegand, T. Overview of the high efficiency video coding (HEVC) standard. IEEE Transactions on circuits and systems for video technology, 22(12):1649-1668, 2012.

Vahdat, A. and Kautz, J. Nvac: A deep hierarchical variational autoencoder. Advances in Neural Information Processing Systems, 33:19667-19679, 2020.

Wallace, G. K. The JPEG still picture compression standard. Communications of the ACM, 34(4):30-44, 1991.

Wang, H., Gan, W., Hu, S., Lin, J. Y., Jin, L., Song, L., Wang, P., Katsavounidis, I., Aaron, A., and Kuo, C.-C. J. MCLJCV: a JND-based H. 264/AVC video quality assessment dataset. In 2016 IEEE international conference on image processing (ICIP), pp. 1509-1513. IEEE, 2016.

Wang, Z., Simoncelli, E. P., and Bovik, A. C. Multiscale structural similarity for image quality assessment. In The Thrity-Seventh Asilomar Conference on Signals, Systems & Computers, 2003, volume 2, pp. 1398-1402. Ieee, 2003.

Wien, M. High efficiency video coding. Coding Tools and specification, 24, 2015.

Wu, C.-Y., Singhal, N., and Krahenbuhl, P. Video compression through image interpolation. In Proceedings of the European conference on computer vision (ECCV), pp. 416-431, 2018.

Xue, T., Chen, B., Wu, J., Wei, D., and Freeman, W. T. Video enhancement with task-oriented flow. International Journal of Computer Vision, 127(8):1106-1125, 2019.

Yang, R., Mentzer, F., Gool, L. V., and Timofte, R. Learning for video compression with hierarchical quality and recurrent enhancement. In Proceedings of the IEEE/CVF Conference on Computer Vision and Pattern Recognition, pp. 6628-6637, 2020.

Zhang, R., Isola, P., Efros, A. A., Shechtman, E., and Wang, O. The unreasonable effectiveness of deep features as a perceptual metric. In Proceedings of the IEEE conference on computer vision and pattern recognition, pp. 586-595, 2018.

Zhu, Y., Yang, Y., and Cohen, T. Transformer-based transform coding. In International Conference on Learning Representations, 2021.

Other Aspects of the disclosure are described below.

Aspect 1A. A method of coding media data, the method comprising: modeling, with a model, a hyperprior variable using a discrete cosine transform (DCT) to generate DCT coefficients; and coding the media data based on the DCT coefficients.

Aspect 2A. The method of aspect 1A, wherein coding the media data comprises using a channel-wise 4×4 parametric mixture of the DCT coefficients to quantize and entropy code the media data.

Aspect 3A. The method of aspect 1A or aspect 2A, further comprising coding frequency information.

Aspect 4A. The method of any of aspects 1A-3A, wherein the model comprises an I-frame model.

Aspect 5A. The method of any of aspects 1A-3A, wherein the model comprises a P-frame model.

Aspect 6A. The method of any of aspects 1A-5A, further comprising applying amortized batch normalization to the media data.

Aspect 7A. The method of any of aspects 1A-6A, further comprising applying context modeling using an unevenly spaced sub-sampled checkerboard to the media data.

Aspect 8A. The method of any of aspects 1A-7A, further comprising quantizing the DCT coefficients using a learned quantization bin size.

Aspect 9A. The method of any of aspects 1A-8A, where media data comprises video data.

Aspect 10A. The method of any of aspects 1A-9A, wherein coding comprises encoding.

Aspect 11A. The method of any of aspects 1A-10A, wherein coding comprises decoding.

Aspect 12A. A device for coding media data, the device comprising: memory configured to store media data; and one or more processors implemented in circuitry and coupled to the memory, the one or more processors being configured to perform the method of any of aspects 1A-11A.

Aspect 13A. The device of aspect 12A, further comprising a camera configured to capture the media data.

Aspect 14A. The device of aspect 12A or aspect 3A, further comprising a display configured to display the media data.

Aspect 15A. A device for coding media data, the device comprising one or more means for perform the method of any of aspects 1A-11A.

Aspect 16A. A non-transitory computer-readable storage medium, storing instructions, which, when executed by one or more processors, cause the one or more processors to perform the method of any of aspects 1A-11A.

Aspect 1B. A method of training a P-frame model for a neural media coder, the method comprising: acquiring a corrupted I-frame; and training the P-frame model using the corrupted I-frame.

Aspect 2B. The method of aspect 1B, wherein the corrupted I-frame comprises an I-frame pre-trained for lower peak signal-to-noise ratio (PSNR) than a Lagrange multiplier.

Aspect 3B. The method of aspect 1B or aspect 2B, wherein training the P-frame model comprises training the P-frame model for less than or equal to seven frames.

Aspect 4B. The method of aspect 3B, wherein training the P-frame model comprises training the P-frame model for three frames.

Aspect 5B. The method of any of aspects 1B-4B, wherein training the P-frame model comprises applying forced quality enhancement (FQE).

Aspect 6B. A method of coding media data, the method comprising: applying a pre-trained P-frame model to the media data, the pre-trained P-frame model being trained using a corrupted I-frame; and coding the media data based on the application of the pre-trained P-frame model to the media data.

Aspect 7B. The method of aspect 6B, where media data comprises video data.

Aspect 8B. The method of aspect 6B or aspect 7B, wherein coding comprises encoding.

Aspect 9B. The method of any of aspects 6B-8B, wherein coding comprises decoding.

Aspect 10B. A device for coding media data, the device comprising: memory configured to store media data; and one or more processors implemented in circuitry and coupled to the memory, the one or more processors being configured to perform the method of any of aspects 1B-9B.

Aspect 11B. The device of aspect 10B, further comprising a camera configured to capture the media data.

Aspect 12B. The device of aspect 10B or aspect 11B, further comprising a display configured to display the media data.

Aspect 13B. A device for coding media data, the device comprising one or more means for perform the method of any of aspects 1B-9B.

Aspect 14B. A non-transitory computer-readable storage medium, storing instructions, which, when executed by one or more processors, cause the one or more processors to perform the method of any of aspects 1B-9B.

Aspect 1C. A method of encoding media data, the method comprising: determining a hyperprior variable of a neural video coder based on the media data; applying a discrete cosine transform (DCT) to the hyperprior variable to generate DCT coefficients; and encoding the DCT coefficients.

Aspect 2C. The method of aspect 1C, wherein encoding the DCT coefficients comprises quantizing a channel-wise parametric mixture of the DCT coefficients to generate quantized DCT coefficients.

Aspect 3C. The method of aspect 2C, wherein encoding the DCT coefficients further comprises entropy encoding the quantized DCT coefficients.

Aspect 4C. The method of aspect 2C or aspect 3C, wherein the channel-wise parametric mixture comprises a channel-wise 4×4 parametric mixture.

Aspect 5C. The method of any of aspects 1C-4C, wherein the hyperprior variable comprises a hyperprior variable of an I-frame model of the neural video coder.

Aspect 6C. The method of any of aspects 1C-4C, wherein the hyperprior variable comprises a hyperprior variable of a P-frame model of the neural video coder.

Aspect 7C. The method of aspect 6C, wherein the P-frame model comprises at least one of a motion estimation model or a conditional coder model.

Aspect 8C. The method of aspect 6C or aspect 7C, wherein the P-frame model is trained using a corrupt I-frame having at least one of a) a peak signal-to-noise ratio (PSNR) that meets a threshold or b) one or more areas of inserted errors.

Aspect 9C. The method of any of aspects 1C-8C, wherein the hyperprior variable is based on a latent variable, and wherein the method further comprises determining the latent variable, wherein determining the latent variable comprises applying context modeling to the media data using an unevenly spaced sub-sampled checkerboard.

Aspect 10C. The method of aspect 9C, wherein using the unevenly spaced sub-sampled checkerboard comprises stacking shifted copies of N×N masks.

Aspect 11C. The method of any of aspects 1C-10C, where media data comprises video data.

Aspect 12C. A method of decoding media data, the method comprising: determining DCT coefficients of a hyperprior variable of a neural video coder; applying an inverse DCT to the DCT coefficients to generate the hyperprior variable; and decoding the media data based on the hyperprior variable.

Aspect 13C. The method of aspect 12C, wherein the DCT coefficients comprise a quantized a channel-wise parametric mixture of DCT coefficients generated by a neural media encoder.

Aspect 14C. The method of aspect 13C, wherein the channel-wise parametric mixture comprises a channel-wise 4×4 parametric mixture.

Aspect 15C. The method of any of aspects 12C-14C, wherein determining the DCT coefficients comprises entropy decoding the DCT coefficients.

Aspect 16C. The method of any of aspects 12C-15C, wherein the hyperprior variable comprises a hyperprior variable of an I-frame model of the neural video decoder.

Aspect 17C. The method of any of aspects 12C-15C, wherein the hyperprior variable comprises a hyperprior variable of a P-frame model of the neural video decoder.

Aspect 18C. The method of aspect 11C, wherein the P-frame model comprises at least one of a motion estimation model or a conditional coder model.

Aspect 19C. The method of aspect 17C or aspect 18C, wherein the P-frame model is trained using a corrupt I-frame having at least one of a) a peak signal-to-noise ratio (PSNR) that meets a threshold or b) one or more areas of inserted errors.

Aspect 20C. The method of any of aspects 12C-19C, wherein the hyperprior variable is based on a latent variable, and wherein decoding the media data comprises: determining the latent variable; and applying context modeling to the latent variable using an unevenly spaced sub-sampled checkerboard.

Aspect 21C. The method of aspect 20C, wherein using the unevenly spaced sub-sampled checkerboard comprises stacking shifted copies of N×N masks.

Aspect 22C. The method of aspect 20C or aspect 21C, further comprising: dividing latent variable data into a plurality of groups, the latent variable data including the latent variable; decoding a first percentage of the latent variable data with a first group of the plurality of groups; decoding a second percentage of the latent variable data with a second group of the plurality of groups; and decoding a third percentage of the latent variable data with a third group of the plurality of groups.

Aspect 23C. The method of aspect 22C, wherein the first percentage and the second percentage are lower than the third percentage.

Aspect 24C. The method of aspect 23C, wherein the first percentage is 25%, the second percentage is 25%, and the third percentage is 50%.

Aspect 25C. The method of any of aspects 12C-24C, where media data comprises video data.

Aspect 26C. A device for encoding media data, the device comprising: one or more memories configured to store the media data; and one or more processors implemented in circuitry and coupled to the one or more memories, the one or more processors being configured to: determine a hyperprior variable of a neural video coder based on the media data; apply a discrete cosine transform (DCT) to the hyperprior variable to generate DCT coefficients; and encode the DCT coefficients.

Aspect 27C. The device of aspect 26C, wherein as part of encoding the DCT coefficients, the one or more processors are configured to quantize channel-wise parametric mixture of the DCT coefficients to generate quantized DCT coefficients.

Aspect 28C. The device of aspect 27C, wherein as part of encoding the DCT coefficients, the one or more processors are configured to entropy encode the quantized DCT coefficients.

Aspect 29C. The device of aspect 27C or aspect 28C, wherein the channel-wise parametric mixture comprises a channel-wise 4×4 parametric mixture.

Aspect 30C. The device of any of aspects 26C-29C, wherein the hyperprior variable comprises a hyperprior variable of an I-frame model of the neural video coder.

Aspect 31C. The device of any of aspects 26C-30C, wherein the hyperprior variable comprises a hyperprior variable of a P-frame model of the neural video coder.

Aspect 32C. The device of aspect 31C, wherein the P-frame model comprises at least one of a motion estimation model or a conditional coder model.

Aspect 33C. The device of aspect 31C or aspect 32C, wherein the P-frame model is trained using a corrupt I-frame having at least one of a) a peak signal-to-noise ratio (PSNR) that meets a threshold or b) one or more areas of inserted errors.

Aspect 34C. The device of any of aspects 26C-33C, wherein the hyperprior variable is based on a latent variable, wherein the one or more processors are further configured to determine a latent variable, and wherein as part of determining the latent variable, the one or more processors are configured to apply context modeling to the media data using an unevenly spaced sub-sampled checkerboard.

Aspect 35C. The device of aspect 34C, wherein as part of using the unevenly spaced sub-sampled checkerboard, the one or more processors are configured to stack shifted copies of N×N masks.

Aspect 36C. The device of any of aspects 26C-35C, where media data comprises video data.

Aspect 37C. The device of any of aspects 26C-36C, further comprising a camera configured to capture the media data.

Aspect 38C. A device for decoding media data, the device comprising: one or more memories configured to store the media data; and one or more processors implemented in circuitry and coupled to the one or more memories, the one or more processors being configured to: determine DCT coefficients of a hyperprior variable of a neural video coder; apply an inverse DCT to the DCT coefficients to generate the hyperprior variable; and decode the media data based on the hyperprior variable.

Aspect 39C. The device of aspect 38C, wherein the DCT coefficients comprise a quantized a channel-wise parametric mixture of DCT coefficients generated by a neural media encoder.

Aspect 40C. The device of aspect 39C, wherein the channel-wise parametric mixture comprises a channel-wise 4×4 parametric mixture.

Aspect 41C. The device of any of aspects 38C-40C, wherein as part of determining the DCT coefficients, the one or more processors are configured to entropy decode the DCT coefficients.

Aspect 42C. The device of any of aspects 38C-41C, wherein the hyperprior variable comprises a hyperprior variable of an I-frame model of the neural video coder.

Aspect 43C. The device of any of aspects 38C-41C, wherein the hyperprior variable comprises a hyperprior variable of a P-frame model of the neural video coder.

Aspect 44C. The device of aspect 43C, wherein the P-frame model comprises at least one of a motion estimation model or a conditional coder model.

Aspect 45C. The device of aspect 43C or aspect 44C, wherein the P-frame model is trained using a corrupt I-frame having at least one of a) a peak signal-to-noise ratio (PSNR) that meets a threshold or b) one or more areas of inserted errors.

Aspect 46C. The device of any of aspects 38C-45C, wherein the hyperprior variable is based on a latent variable, and wherein as part of decoding the media data, the one or more processors are configured to: determine the latent variable; and apply context modeling to the latent variable using an unevenly spaced sub-sampled checkerboard.

Aspect 47C. The device of aspect 46C, wherein as part of using the unevenly spaced sub-sampled checkerboard, the one or more processors are configured to stack shifted copies of N×N masks.

Aspect 48C. The device of aspect 46C or aspect 47C, wherein the one or more processors are further configured to: divide latent variable data into a plurality of groups, the latent variable data including the latent variable; decode a first percentage of the latent variable data with a first group of the plurality of groups; decode a second percentage of the latent variable data with a second group of the plurality of groups; and decode a third percentage of the latent variable data with a third group of the plurality of groups.

Aspect 49C. The device of aspect 48C, wherein the first percentage and the second percentage are lower than the third percentage.

Aspect 50C. The device of aspect 49C, wherein the first percentage is 25%, the second percentage is 25%, and the third percentage is 50%.

Aspect 51C. The device of any of aspects 38C-50C, where media data comprises video data.

Aspect 52C. The device of any of aspects 38C-51C, further comprising a display configured to display the media data.

Aspect 1D. A method of training a P-frame model for a neural media coder, the method comprising: acquiring a corrupt I-frame, the corrupt I-frame having at least one of a) a peak signal-to-noise ratio (PSNR) that meets a threshold or b) one or more areas of inserted errors; and training the P-frame model using the corrupt I-frame.

Aspect 2D. The method of aspect 1D, further comprising generating the corrupt I-frame.

Aspect 3D. The method of aspect 1D or 2D, wherein the corrupt I-frame has the PSNR that meets the threshold and wherein to meet the threshold, the PSNR is lower than the threshold or lower than or equal to the threshold.

Aspect 4D. The method of any of aspects 1D-3D, wherein the threshold is based on a Lagrange multiplier associated with the P-frame model.

Aspect 5D. The method of any of aspects 1D-4D, wherein the corrupt I-frame is pre-configured to meet the threshold.

Aspect 6D. The method of any of aspects 1D-5D, wherein training the P-frame model comprises training the P-frame model for less than or equal to seven frames.

Aspect 7D. The method of aspect 6, wherein training the P-frame model comprises training the P-frame model for three frames.

Aspect 8D. A method of coding media data, the method comprising: applying a pre-trained P-frame model to the media data, the pre-trained P-frame model being trained using a corrupt I-frame, the corrupt I-frame having at least one of a) a peak signal-to-noise ratio (PSNR) that meets a threshold or b) one or more areas of inserted errors; and coding the media data based on the application of the pre-trained P-frame model to the media data.

Aspect 9D. The method of aspect 8D, wherein the corrupt I-frame has the PSNR that meets the threshold and wherein to meet the threshold, the PSNR is lower than the threshold or lower than or equal to the threshold.

Aspect 10D. The method of aspect 8D or 9D, where media data comprises video data.

Aspect 11D. The method of any of aspects 8D-10D, wherein coding comprises encoding.

Aspect 12D. The method of any of aspects 8D-10D, wherein coding comprises decoding.

Aspect 13D. A device comprising: one or more memories configured to store media data and a P-frame model; and one or more processors implemented in circuitry and coupled to the one or more memories, the one or more processors being configured to: acquire a corrupt I-frame, the corrupt I-frame having at least one of a) a peak signal-to-noise ratio (PSNR) lower than a threshold or b) one or more areas of inserted errors; and train the P-frame model using the corrupt I-frame.

Aspect 14D. The device of aspect 13D, wherein the one or more processors are further configured to generate the corrupt I-frame.

Aspect 15D. The device of aspect 13D or 14D, wherein the corrupt I-frame has the PSNR that meets the threshold and wherein to meet the threshold, the PSNR is lower than the threshold or lower than or equal to the threshold.

Aspect 16D. The device of any of aspects 13D-15D, wherein the threshold is based on a Lagrange multiplier associated with the P-frame model.

Aspect 17D. The device of any of aspects 13D-16D, wherein the corrupt I-frame is pre-configured to meet the threshold.

Aspect 18D. The device of any of aspects 13D-17D, wherein the threshold comprises a Lagrange multiplier.

Aspect 19D. The device of any of aspects 13D-18D, wherein the one or more processors are configured to train the P-frame model for less than or equal to seven frames.

Aspect 20D. The device of aspect 19D, wherein the one or more processors are configured to train the P-frame model for three frames.

Aspect 21D. The device of any of aspects 13D-20D, further comprising a camera configured to capture the media data.

Aspect 22D. The device of any of aspects 13D-20D, further comprising a display configured to display the media data.

Aspect 23D. A device for coding media data, the device comprising: one or more memories configured to store media data; and one or more processors implemented in circuitry and coupled to the one or more memories, the one or more processors being configured to: apply a pre-trained P-frame model to the media data, the pre-trained P-frame model being trained using a corrupt I-frame, the corrupt I-frame having at least one of a) a peak signal-to-noise ratio (PSNR) that meets a threshold or b) one or more areas of inserted errors; and code the media data based on the application of the pre-trained P-frame model to the media data.

Aspect 24D. The device of aspect 23D, wherein the corrupt I-frame has the PSNR that meets the threshold and wherein to meet the threshold, the PSNR is lower than the threshold or lower than or equal to the threshold.

Aspect 25D. The device of aspect 23D or 24D, where media data comprises video data.

Aspect 26D. The device of any of aspects 23D-25D, wherein as part of coding the media data, the one or more processors are configured to encode the media data.

Aspect 27D. The device of any of aspects 23D-25D, wherein as part of coding the media data, the one or more processors are configured to decode the media data.

Aspect 28D. The device of any of aspects 23D-26D, further comprising a camera configured to capture the media data.

Aspect 29D. The device of any of aspects 23D-25D, or 27D, further comprising a display configured to display the media data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding media data, the method comprising:

determining DCT coefficients of a hyperprior variable of a neural video coder;

applying an inverse DCT to the DCT coefficients to generate the hyperprior variable; and decoding the media data based on the hyperprior variable.

2. The method of claim 1, wherein the DCT coefficients comprise a quantized a channel-wise parametric mixture of DCT coefficients generated by a neural media encoder.

3. The method of claim 2, wherein the channel-wise parametric mixture comprises a channel-wise 4×4 parametric mixture.

4. The method of claim 1, wherein determining the DCT coefficients comprises entropy decoding the DCT coefficients.

5. The method of claim 1, wherein the hyperprior variable comprises a hyperprior variable of an I-frame model of the neural video decoder.

6. The method of claim 1, wherein the hyperprior variable comprises a hyperprior variable of a P-frame model of the neural video decoder.

7. The method of claim 6, wherein the P-frame model comprises at least one of a motion estimation model or a conditional coder model.

8. The method of claim 6, wherein the P-frame model is trained using a corrupt I-frame having at least one of a) a peak signal-to-noise ratio (PSNR) that meets a threshold or b) one or more areas of inserted errors.

9. The method of claim 1, wherein the hyperprior variable is based on a latent variable, and wherein decoding the media data comprises:

determining the latent variable; and applying context modeling to the latent variable using an unevenly spaced sub-sampled checkerboard.

10. The method of claim 9, wherein using the unevenly spaced sub-sampled checkerboard comprises stacking shifted copies of N×N masks.

11. The method of claim 9, further comprising:

dividing latent variable data into a plurality of groups, the latent variable data including the latent variable;

decoding a first percentage of the latent variable data with a first group of the plurality of groups;

decoding a second percentage of the latent variable data with a second group of the plurality of groups; and decoding a third percentage of the latent variable data with a third group of the plurality of groups.

12. The method of claim 11, wherein the first percentage and the second percentage are lower than the third percentage.

13. The method of claim 12, wherein the first percentage is 25%, the second percentage is 25%, and the third percentage is 50%.

14. The method of claim 1, where media data comprises video data.

15. A device for decoding media data, the device comprising:

one or more memories configured to store the media data; and one or more processors implemented in circuitry and coupled to the one or more memories, the one or more processors being configured to:

determine DCT coefficients of a hyperprior variable of a neural video coder;

apply an inverse DCT to the DCT coefficients to generate the hyperprior variable; and decode the media data based on the hyperprior variable.

16. The device of claim 15, wherein the DCT coefficients comprise a quantized a channel-wise parametric mixture of DCT coefficients generated by a neural media encoder.

17. The device of claim 16, wherein the channel-wise parametric mixture comprises a channel-wise 4×4 parametric mixture.

18. The device of claim 15, wherein as part of determining the DCT coefficients, the one or more processors are configured to entropy decode the DCT coefficients.

19. The device of claim 15, wherein the hyperprior variable comprises a hyperprior variable of an I-frame model of the neural video coder.

20. The device of claim 15, wherein the hyperprior variable comprises a hyperprior variable of a P-frame model of the neural video coder.

21. The device of claim 20, wherein the P-frame model comprises at least one of a motion estimation model or a conditional coder model.

22. The device of claim 21, wherein the P-frame model is trained using a corrupt I-frame having at least one of a) a peak signal-to-noise ratio (PSNR) that meets a threshold or b) one or more areas of inserted errors.

23. The device of claim 15, wherein the hyperprior variable is based on a latent variable, and wherein as part of decoding the media data, the one or more processors are configured to:

determine the latent variable; and apply context modeling to the latent variable using an unevenly spaced sub-sampled checkerboard.

24. The device of claim 23, wherein as part of using the unevenly spaced sub-sampled checkerboard, the one or more processors are configured to stack shifted copies of N×N masks.

25. The device of claim 23, wherein the one or more processors are further configured to:

divide latent variable data into a plurality of groups, the latent variable data including the latent variable;

decode a first percentage of the latent variable data with a first group of the plurality of groups;

decode a second percentage of the latent variable data with a second group of the plurality of groups; and decode a third percentage of the latent variable data with a third group of the plurality of groups.

26. The device of claim 25, wherein the first percentage and the second percentage are lower than the third percentage.

27. The device of claim 25, wherein the first percentage is 25%, the second percentage is 25%, and the third percentage is 50%.

28. The device of claim 15, where media data comprises video data.

29. The device of claim 15, further comprising a display configured to display the media data.

* * * * *